United States Patent
Shinohara et al.

(10) Patent No.: US 9,235,200 B2
(45) Date of Patent: Jan. 12, 2016

(54) IMAGING LENS AND IMAGING APPARATUS EQUIPPED WITH THE IMAGING LENS

(71) Applicant: FUJIFILM CORPORATION, Tokyo (JP)

(72) Inventors: Yoshikazu Shinohara, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/335,965

(22) Filed: Jul. 21, 2014

(65) Prior Publication Data

US 2015/0022905 A1 Jan. 22, 2015

(30) Foreign Application Priority Data

Jul. 19, 2013 (JP) ................. 2013/150124

(51) Int. Cl.
*G02B 13/04* (2006.01)
*G02B 9/62* (2006.01)
*G02B 13/18* (2006.01)
*G02B 3/02* (2006.01)
*G05B 13/04* (2006.01)
*G02B 13/00* (2006.01)

(52) U.S. Cl.
CPC ............ *G05B 13/04* (2013.01); *G02B 13/0045* (2013.01)

(58) Field of Classification Search
CPC ...... G02B 13/0045; G02B 9/62; G02B 13/04; G02B 15/177; G02B 5/005
USPC .......................................... 359/752, 756, 761
See application file for complete search history.

(56) References Cited

U.S. PATENT DOCUMENTS

2014/0118844 A1* 5/2014 Tsai et al. ..................... 359/713

FOREIGN PATENT DOCUMENTS

| JP | 4-317020 | 11/1992 |
| JP | 2004-294910 | 10/2004 |
| JP | 2005-258294 | 9/2005 |

* cited by examiner

*Primary Examiner* — Alicia M Harrington
(74) *Attorney, Agent, or Firm* — Young & Thompson

(57) ABSTRACT

An imaging lens substantially includes six lenses, constituted by: a first lens having a negative refractive power, which is of a meniscus shape having a concave surface toward an image side; a second lens; a third lens; a fourth lens; a fifth lens having a positive refractive power; and a sixth lens having a negative refractive power, a concave surface toward the image side, and at least one inflection point in the surface toward the image side; provided in this order from an object side. The imaging lens satisfies a predetermined conditional formula.

19 Claims, 14 Drawing Sheets

EXAMPLE 4

EXAMPLE 5

EXAMPLE 6

EXAMPLE 1

IMAGING LENS AND IMAGING APPARATUS EQUIPPED WITH THE IMAGING LENS

CROSS REFERENCE TO RELATED APPLICATIONS

The present application claims priority under 35 USC §119 to Japanese Patent Application No. 2013-150124, filed on Jul. 19, 2013. The above application is hereby expressly incorporated by reference in its entirety, into the present application.

TECHNICAL FIELD

The present invention is related to a fixed focus imaging lens for forming optical images of subjects onto an imaging element such as a CCD (Charge Coupled Device) and a CMOS (Complementary Metal Oxide Semiconductor). The present invention is also related to an imaging apparatus provided with the imaging lens that performs photography such as a digital still camera, a cellular telephone with a built in camera, a PDA (Personal Digital Assistant), a smart phone, and a portable gaming device.

BACKGROUND ART

Accompanying the recent spread of personal computers in households, digital still cameras capable of inputting image data such as photographed scenes and portraits into personal computers are rapidly becoming available. In addition, many cellular telephones, smart phones, and tablet type terminals are being equipped with camera modules for inputting images. The number of pixels in imaging elements such as CCD's and CMOS's is increasing in devices having such photography functions, and there is demand for high resolution and high performance of imaging lenses. Performance corresponding to 5 megapixels or greater, and more preferably 8 megapixels or greater, is desired.

In response to such demands, imaging lenses having a five lens configuration, which is a comparatively large number of lenses, have been proposed. Further, imaging lenses having a six lens configuration, which is an even greater number of lenses, have been proposed to further improve performance. For example, Japanese Unexamined Patent Publication Nos. 2004-294910, 2005-258294, and 4 (1992)-317020 disclose imaging lenses having six lens configurations, including a first lens having a negative refractive power, a second lens, a third lens, a fourth lens, a fifth lens having a positive refractive power, and a sixth lens having a negative refractive power, provided in this order from an object side.

DISCLOSURE OF THE INVENTION

Meanwhile, there is demand to obtain images that include desired image portions, which are photographed at high resolution with as wide an angle of view as possible, and to employ the desired image portions within the photographed images by enlarging the desired image portions, in imaging lenses which are employed, particularly in devices such as smart phones and tablet terminals. An imaging lens having a wide angle of view is desired in order to meet this demand. However, the imaging lenses disclosed in Japanese Unexamined Patent Publication Nos. 2004-294910, 2005-258294, and 4 (1992)-317020 cannot realize a desired angle of view, and further widening of the angle of view is necessary in these imaging lenses.

The present invention has been developed in view of the foregoing points. The object of the present invention is to provide an imaging lens that can realize high imaging performance from a central angle of view through peripheral angles of view while realizing a wide angle of view. It is another object of the present invention to provide an imaging apparatus equipped with the lens, which is capable of obtaining high resolution photographed images.

An imaging lens of the present invention substantially consists of six lenses, including:

a first lens, which is of a meniscus shape having a concave surface toward an image side, having a negative refractive power;

a second lens;

a third lens;

a fourth lens;

a fifth lens having a positive refractive power; and a sixth lens having a negative refractive power, a concave surface toward the image side, and at least one inflection point on the surface toward the image side; provided in this order from an object side;

the imaging lens satisfying the following conditional formula:

$$1.5 < f \tan \omega / R6r < 20 \tag{1}$$

wherein f is the focal length of the entire system, ω is the half angle of view, and R6r is the paraxial radius of curvature of the surface of the sixth lens toward the image side.

Note that in the imaging lens of the present invention, the expression "substantially consists of six lenses" means that the imaging lens of the present invention may also include lenses that practically have no power, optical elements other than lenses such as aperture stops and a cover glass, and mechanical components such as lens flanges, a lens barrel, an imaging element, a blur correcting mechanism, etc., in addition to the six lenses. In addition, the shapes of the surfaces of the lenses and the signs of the refractive indices thereof are considered in the paraxial region in the case that the lenses include aspherical surfaces.

The optical performance of the imaging lens of the present invention can be further improved by adopting the following favorable configurations.

In the imaging lens of the present invention, it is preferable for the second lens to have a positive refractive power. In addition, it is more preferable for the second lens to be of a biconvex shape.

In the imaging lens of the present invention, it is preferable for the third lens to have a negative refractive power.

In addition, it is preferable for the imaging lens of the present invention to further be equipped with an aperture stop provided between the surface of the first lens toward the object side and the surface of the second lens toward the image side.

It is preferable for the imaging lens of the present invention to satisfy one of Conditional Formulae (1-1) through (7-1) below. Note that a preferred aspect of the imaging lens of the present invention may satisfy any one of Conditional Formulae (1-1) through (7-1), or may satisfy arbitrary combinations of Conditional Formulae (1-1) through (7-1).

$$2 < f \tan \omega / R6r < 15 \tag{1-1}$$

$$3 < f \tan \omega / R6r < 10 \tag{1-2}$$

$$-0.7 < f/R4f < 0 \tag{2}$$

$$-0.7 < f/R4f < -0.1 \tag{2-1}$$

$$-0.65 < f/f4 < 0.55 \quad (3)$$

$$-0.4 < f/f4 < 0.5 \quad (3\text{-}1)$$

$$TTL/f < 2.2 \quad (4)$$

$$0.8 < TTL/f < 2.2 \quad (4\text{-}1)$$

$$0.4 < f/f12 < 1.25 \quad (5)$$

$$0.7 < f/f12 < 1.2 \quad (5\text{-}1)$$

$$1.1 < f/f5 < 1.95 \quad (6)$$

$$1.3 < f/f5 < 1.95 \quad (6\text{-}1)$$

$$0.7 < f/f2 < 1.8 \quad (7)$$

$$0.9 < f/f2 < 1.5 \quad (7\text{-}1)$$

wherein f is the focal length of the entire system, ω is the half angle of view, R6r is the paraxial radius of curvature of the surface of the sixth lens toward the image side, R4f is the paraxial radius of curvature of the fourth lens toward the object side, f2 is the focal length of the second lens, f4 is the focal length of the fourth lens, f5 is the focal length of the fifth lens, f12 is the combined focal length of the first lens and the second lens, and TTL is the distance along the optical axis from the surface of the first lens toward the object side to an image formation plane in the case that the amount of back focus is an air converted length.

An imaging apparatus of the present invention is equipped with the imaging lens of the present invention.

In the imaging lens of the present invention, the configuration of each lens element in a six lens configuration is optimized. Therefore, a lens system having a wide angle of view and high imaging performance from a central angle of view through peripheral angles of view, can be realized.

In addition, the imaging apparatus of the present invention outputs image signals corresponding to optical images formed by the imaging lens of the present invention, which has high imaging performance. Therefore, high resolution images can be obtained.

BEST MODE FOR CARRYING OUT THE INVENTION

Hereinafter, embodiments of the present invention will be described in detail with reference to the attached drawings.

Figure 1:
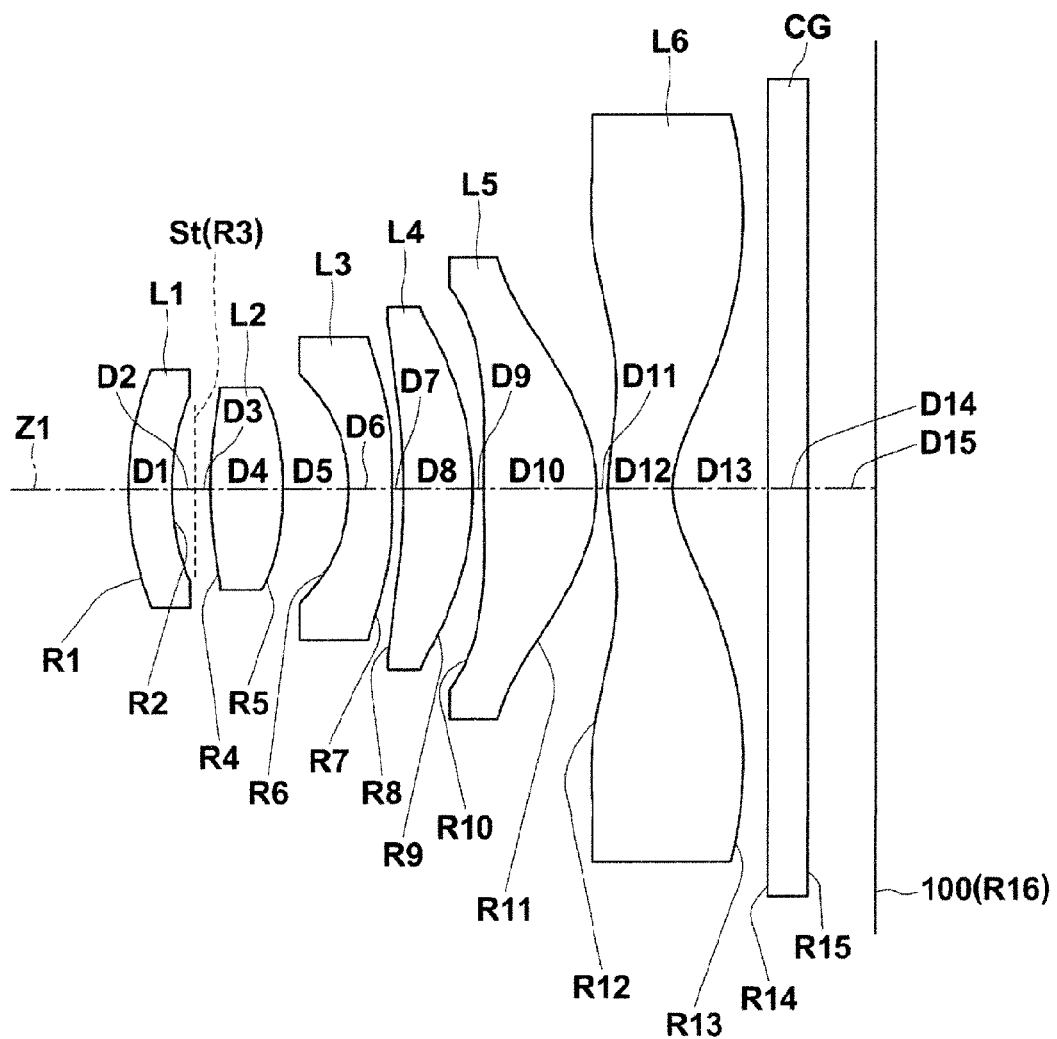
FIG. 1 is a sectional diagram that illustrates a first example of the configuration of an imaging lens according to an embodiment of the present invention, and corresponds to a lens of Example 1.

FIG. 1 illustrates a first example of the configuration of an imaging lens according to an embodiment of the present invention. This example corresponds to the lens configuration of Numerical Example 1 (Table 1 and Table 2), to be described later. Similarly, FIG. 2 through FIG. 6 are sectional diagrams that illustrate second through fourth examples of lens configurations that correspond to Numerical Examples 2 through 6 (Table 3 through Table 12). In FIGS. 1 through 6, the symbol Ri represents the radii of curvature of ith surfaces, i being lens surface numbers that sequentially increase from the object side to the image side (imaging side), with the surface of a lens element most toward the object side designated as first. The symbol Di represents the distances between an ith surface and an i+1st surface along an optical axis Z1. Note that the basic configurations of the examples are the same, and therefore a description will be given of the imaging lens of FIG. 1 as a base, and the examples of FIGS. 2 through 6 will also be described as necessary. In addition, FIG. 5 is a diagram that illustrates the paths of light rays that pass through the imaging lens L of FIG. 1. FIG. 7 illustrates the paths of an axial light beam 2 and a maximum angle of view light beam 3 from an object at a distance of infinity.

The imaging lens L of the embodiment of the present invention is favorably employed in various imaging devices that employ imaging elements such as a CCD and a CMOS. The imaging lens L of the embodiment of the present invention is particularly favorable for use in comparatively miniature portable terminal devices, such as a digital still camera, a cellular telephone with a built in camera, a smart phone, a tablet type terminal, and a PDA. The imaging lens L is equipped with a first lens L1, a second lens L2, a third lens L3, a fourth lens L4, a fifth lens L5, and a sixth lens L6 along the optical axis Z1, in this order from the object side.

Figure 14:
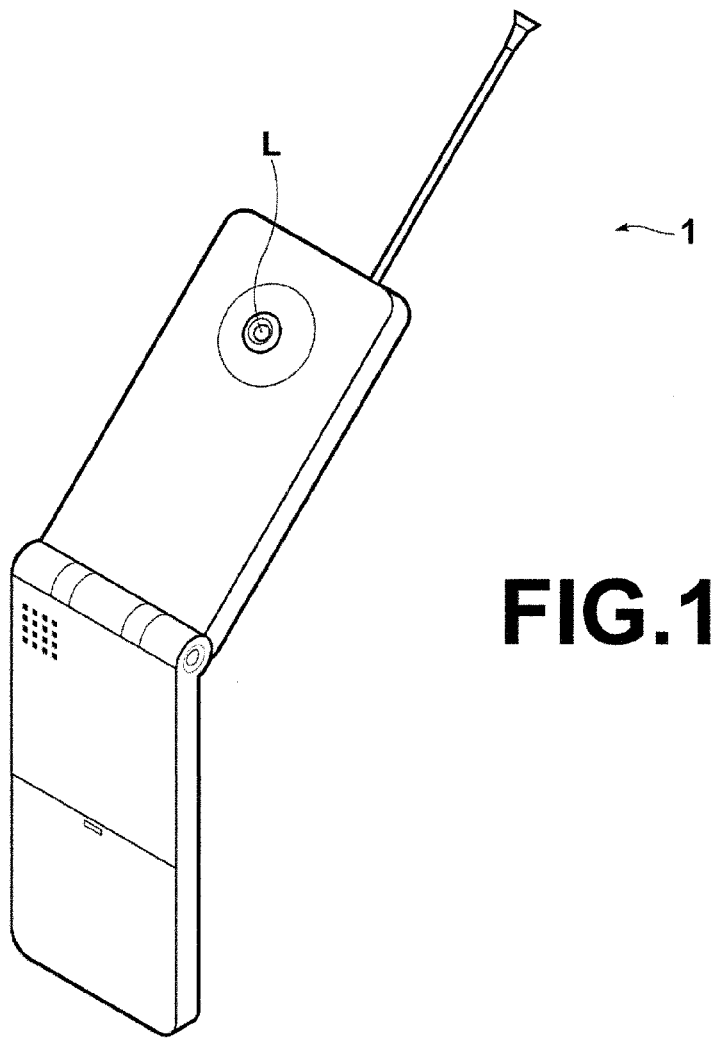
FIG. 14 is a diagram that illustrates a cellular telephone as an imaging apparatus equipped with the imaging lens of the present invention.

FIG. 14 schematically illustrates a cellular telephone as an imaging apparatus 1 according to an embodiment of the present invention. The imaging apparatus 1 of the embodiment of the present invention is equipped with the imaging lens L according to the embodiment of the present invention and an imaging element 100 (refer to FIG. 1) such as a CCD that outputs image signals corresponding to optical images formed by the imaging lens L. The imaging element 100 is provided at an image formation plane (imaging surface R16 in FIGS. 1 through 6) of the imaging lens L.

Figure 15:
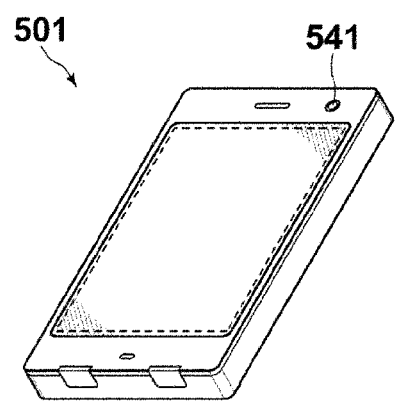
FIG. 15 is a diagram that illustrates a smart phone as an imaging apparatus equipped with the imaging lens of the present invention.

FIG. 15 schematically illustrates a smart phone as an imaging apparatus 501 according to an embodiment of the present invention. The imaging apparatus 501 of the embodiment of the present invention is equipped with a camera section 541 having the imaging lens L according to the embodiment of the present invention and an imaging element 100 (refer to FIG. 1) such as a CCD that outputs image signals corresponding to optical images formed by the imaging lens L. The imaging element 100 is provided at an image formation plane (imaging surface) of the imaging lens L.

Various optical members CG may be provided between the sixth lens L6 and the imaging element 100, depending on the configuration of the camera to which the lens is applied. A planar optical member such as a cover glass for protecting the image formation plane and an infrared cutoff filter may be provided, for example. In this case, a planar cover glass having a coating having a filtering effect such as an infrared cutoff filter coating or an ND filter coating, or a material that exhibits similar effects, may be utilized as the optical member CG.

Alternatively, the optical member CG may be omitted, and a coating may be administered on the sixth lens L6 to obtain the same effect as that of the optical member CG. In this case, the number of parts can be reduced, and the total length of the lens system can be shortened.

It is preferable for the imaging lens L to be equipped with an aperture stop St provided between the surface of the first lens L1 toward the object side and the surface of the second lens L2 toward the image side. In the case that the aperture stop St is provided more toward the image side than the surface of the first lens L1 toward the object side, the operative effects of the negative refractive power of the first lens L1 can be favorably secured. Therefore, this configuration is advantageous from the viewpoint of realizing a wide angle of view. In addition, in the case that the aperture stop St is provided more toward the object side than the surface of the second lens L2 toward the image side, the position of an exit pupil can be more toward the object side, and increases in the incident angles of light rays that pass through the optical system into the image formation plane (imaging element) can be suppressed, particularly at the peripheral portions of an imaging region. In the present embodiment, the lenses of Examples 1 through 6 (FIGS. 1 through 6) have configurations in which the aperture stop St is provided between the surface of the first lens L1 toward the object side and the surface of the second lens L2 toward the image side. Note that the aperture stops St illustrated in FIGS. 1 through 6 do not necessarily represent the sizes or shapes thereof, but indicate the positions thereof on the optical axis Z1.

In the imaging lens L, the first lens L1 has a negative refractive power in the vicinity of the optical axis. Thereby, increases in the angles between light rays that have passed through the first lens L1 and the optical axis can be suppressed, which is advantageous from the viewpoint of realizing a wide angle of view. In addition, the first lens L1 has a negative refractive power in the vicinity of the optical axis and is of a meniscus shape having a concave surface toward the object side. Thereby, distortion, which is likely to occur in the case that the first lens L1 is a lens having a negative refractive power, can be favorably suppressed.

It is preferable for the second lens L2 to have a positive refractive power in the vicinity of the optical axis. In this case, shortening of the total length of the lens system can be favorably realized. In addition, it is preferable for the second lens L2 to be of a biconvex shape in the vicinity of the optical axis, as shown in each of the Examples. In this case, spherical aberration can be favorably corrected.

It is preferable for the third lens L3 to have a negative refractive power in the vicinity of the optical axis. In this case, spherical aberration, longitudinal chromatic aberration, and lateral chromatic aberration can be favorably corrected. In addition, it is preferable for the third lens L3 to be of a biconcave shape in the vicinity of the optical axis, as shown in each of the Examples. In this case, spherical aberration can be favorably corrected. Further, it is preferable for the third lens L3 to be of a biconcave shape with a surface having a radius of curvature with a small absolute value toward the object side. In this case, astigmatism can be favorably corrected.

The fourth lens L4 may have a negative refractive power or a positive refractive power in the vicinity of the optical axis as long as a desired performance can be realized. In the case that the fourth lens L4 has a positive refractive power, spherical aberration can be favorably corrected. In addition, in the case that the fourth lens L4 may be of a meniscus shape having a convex surface toward the image side as shown in Examples 1 through 3, 5, and 6. In this case, astigmatism can be favorably corrected. Alternatively, the fourth lens L4 may be of a biconcave shape with a surface having a radius of curvature with a small absolute value toward the object side. In this case, the generation of high order spherical aberration can be favorably suppressed.

The fifth lens L5 has a positive refractive power in the vicinity of the optical axis. Thereby, lateral chromatic aberration can be favorably corrected, while realizing a shortening of the total length of the lens system. In addition, it is preferable for the fifth lens L5 to be of a biconvex shape in the vicinity of the optical axis as shown in Examples 1 through 5. In this case, astigmatism can be corrected with favorable balance, while suppressing increases in the incident angles of light rays that pass through the optical system at peripheral angles of view into the image formation plane (imaging element). In addition, it is preferable for the fifth lens L5 to be of a biconvex shape with a surface which has a radius of curvature with a small absolute value toward the image side, as shown in Examples 1 through 5. In this case, astigmatism can be more favorably corrected. Alternatively, the fifth lens L5 may be of a meniscus shape having a convex surface toward the image side in the vicinity of the optical axis, as shown in Example 6. Astigmatism can be favorably corrected in this case as well.

The sixth lens L6 has a negative refractive power in the vicinity of the optical axis. The total length can be favorably shortened, by providing a lens having a negative refractive power in the vicinity of the optical axis most toward the image side in the imaging lens. In addition, widening of the angle of view can be facilitated by the sixth lens L6 having a negative refractive power in the vicinity of the optical axis, which enables the Petzval sum to be reduced and field curvature to be favorably corrected.

In addition, the sixth lens L6 has a concave surface toward the image side in the vicinity of the optical axis. Field curvature can be favorably corrected while shortening of the total length of the lens system can be realized more favorably, by the sixth lens L6 having a concave surface toward the image side in the vicinity of the optical axis. It is preferable for the sixth lens L6 to be of a meniscus shape with a concave surface toward the image side in the vicinity of the optical axis, as shown in Examples 1 through 6. In this case, the necessity to set the negative refractive power of the sixth lens L6 becomes less likely to occur, which is advantageous from the viewpoint of shortening the total length of the lens system.

In addition, shortcomings, such as the incident angles of light rays at peripheral angles of view into the image formation plane increasing and light rays at peripheral angles of view not reaching the image formation plane due to being totally reflected, may arise in the case that the sixth lens L6 is a spherical lens having a concave surface toward the image side and the surface of the sixth lens L6 toward the image side has a radius of curvature with a small absolute value. However, the sixth lens L6 is configured to have a concave surface toward the image side in the vicinity of the optical axis and the surface toward the image side is of an aspherical shape having at least one inflection point within the effective diameter thereof, as illustrated in each of the Examples. Therefore, increases in the incident angles of light rays that pass through the optical system at peripheral angles of view into the image formation plane (imaging element) can be suppressed, particularly at the peripheral portions of an imaging region, and the occurrence of the aforementioned shortcoming caused by total reflection of light rays at peripheral angles of view can be suppressed. Note that the "inflection point" on the surface of the sixth lens L6 toward the image side refers to a point at which the shape of the surface of the sixth lens L6 toward the image side changes from a convex shape to a concave shape (or from a concave shape to a convex shape) with respect to the image side. The position of the inflection point may be any arbitrary position within a range from the optical axis to the effective diameter of the surface of the sixth lens L6 toward the object side.

According to the imaging lens L described above, the configurations of each of the first lens through the sixth lens are optimized as lens elements in a lens configuration having a total of six lenses. Therefore, a lens system having a wide angle of view and high resolution performance can be realized.

It is preferable for at least one of the surfaces of each of the first lens L1 through the sixth lens L6 of the imaging L to be an aspherical surface, in order to improve performance.

In addition, it is preferable for each of the lenses L1 through L6 that constitutes the imaging lens L to be a single lens, not a cemented lens. If the lenses L1 through L6 are single lenses, the number of aspherical surfaces will be greater than that in the case that any of the lenses L1 through L6 is a cemented lens. Therefore, the degree of freedom in the design of each lens will increase, and the total length can be favorably shortened.

Next, the operation and effects of conditional formulae related to the imaging lens L will be described in greater detail. Note that it is preferable for the imaging lens L to satisfy any one of the following conditional formulae, or arbitrary combinations of the following conditional formulae. It is preferable for the conditional formulae to be satisfied to be selected as appropriate according to the items required of the imaging lens L.

First, it is preferable for the focal distance f of the entire system, the half angle of view $\omega$, and the paraxial radius of curvature R6r of the surface of the sixth lens L6 toward the image side to satisfy Conditional Formula (1) below.

$$1.5 < f \cdot \tan \omega / R6r < 20 \quad (1)$$

Conditional Formula (1) defines a preferable range of numerical values for the ratio of a paraxial image height (f·tan $\omega$) with respect to the paraxial radius of curvature R6r of the surface of the sixth lens L6 toward the image side. By setting the paraxial image height (f·tan $\omega$) with respect to the paraxial radius of curvature R6r of the surface of the sixth lens L6 toward the image side such that the value of f·tan $\omega$/R6r is not less than or equal to the lower limit defined in Conditional Formula (1), the absolute value of the paraxial radius of curvature R6r of the surface of the sixth lens L6 toward the image side, which is the surface most toward the image side in the imaging lens, with respect to the paraxial image height (f·tan $\omega$), will not be excessively large. Thereby, field curvature can be sufficiently corrected while realizing a shortening of the total length. Note that field curvature can be favorably corrected from a central angle of view to peripheral angles of view in the case that in the case that the sixth lens L6 is of an aspherical shape having a concave surface toward the image side and at least one inflection point as illustrated in the imaging lenses of each of the Examples, and in the case that the lower limit of Conditional Formula (1) is satisfied. Therefore, this configuration is favorable from the viewpoint of realizing a wide angle of view. In addition, by setting the paraxial image height (f·tan $\omega$) with respect to the paraxial radius of curvature R6r of the surface of the sixth lens L6 toward the image side such that the value of f·tan $\omega$/R6r is not greater than or equal to the upper limit defined in Conditional Formula (1), the absolute value of the paraxial radius of curvature R6r of the surface of the sixth lens L6 toward the image side, which is the surface most toward the image side in the imaging lens, with respect to the paraxial image height (f·tan $\omega$), will not be excessively small. Thereby, increases in the incident angle of light rays that pass through the optical system and enter the image formation plane (imaging element) can be suppressed, particularly at peripheral angles of view, and field curvature being excessively corrected can be suppressed. It is preferable for Conditional Formula (1-1) to be satisfied, and more preferable for Conditional Formula (1-2) to be satisfied, in order to cause these advantageous effects to become more prominent.

$$2 < f \cdot \tan \omega / R6r < 15 \quad (1\text{-}1)$$

$$3 < f \cdot \tan \omega / R6r < 10 \quad (1\text{-}2)$$

In addition, it is preferable for the focal length f of the entire system to satisfy Conditional Formula (2) below with respect to the paraxial radius of curvature R4f of the surface of the fourth lens L4 toward the object side.

$$-0.7 < f/R4f < 0 \quad (2)$$

Conditional Formula (2) defines the preferable range of numerical values of the ratio of the focal length f of the entire system with respect to the paraxial radius of curvature R4f of the surface of the fourth lens L4 toward the object side. By setting the ratio of the focal length f of the entire system with respect to the paraxial radius of curvature R4f of the surface of the fourth lens L4 toward the object side such that the value of f/R4f is not less than or equal to the lower limit defined in Conditional Formula (2), the generation of spherical aberration can be suppressed. By setting the ratio of the focal length f of the entire system with respect to the paraxial radius of curvature R4f of the surface of the fourth lens L4 toward the object side such that the value of f/R4f is not greater than or equal to the upper limit defined in Conditional Formula (2), astigmatism can be favorably corrected. It is more preferable for Conditional Formula (2-1) below to be satisfied, in order to cause these advantageous effects to become more prominent.

$$-0.7 < f/R4f < -0.1 \qquad (2\text{-}1)$$

In addition, it is preferable for the focal length f of the entire system and the focal length f4 of the fourth lens L4 to satisfy Conditional Formula (3) below.

$$-0.65 < f/f4 < 0.55 \qquad (3)$$

Conditional Formula (3) defines the preferred range of numerical values for the ratio of the focal length f of the entire system with respect to the focal length f4 of the fourth lens L4. By maintaining the refractive power of the fourth lens L4 such that the value of f/f4 is not less than or equal to the lower limit defined in Conditional Formula (3), the negative refractive power of the fourth lens L4 will not become excessively strong with respect to the refractive power of the entire system, which is advantageous from the viewpoint of shortening the total length of the lens system. By securing the refractive power of the fourth lens L4 such that the value of f/f4 is not greater than or equal to the upper limit defined in Conditional Formula (3), the refractive power of the fourth lens L4 will not become excessively strong with respect to the refractive power of the entire system. As a result, the generation of spherical aberration due to the fourth lens L4 can be suppressed. It is more preferable for Conditional Formula (3-1) below to be satisfied, in order to cause these advantageous effects to become more prominent.

$$-0.4 < f/f4 < 0.5 \qquad (3\text{-}1)$$

In addition, it is preferable for the distance TTL along the optical axis from the surface of the first lens L1 toward the object side to the image formation plane and the focal length f of the entire system to satisfy Conditional Formula (4) below.

$$TTL/f < 2.2 \qquad (4)$$

Conditional Formula (4) defines a preferable range of numerical values for the ratio of the focal length f of the entire system with respect to the distance TTL along the optical axis from the surface of the first lens L1 toward the object side to the image formation plane. Note that the portion of the distance TTL along the optical axis from the surface of the first lens L1 toward the object side to the image formation plane corresponding to back focus (the distance along the optical axis from the apex of the surface of the sixth lens L6 toward the image side to the image formation plane) is an air converted length. By maintaining the distance TTL along the optical axis from the surface of the first lens L1 toward the object side to the image formation plane such that the value of TTL/f is not greater than or equal to the upper limit defined in Conditional Formula (4), the focal length f of the entire system necessary to widen the angle of view can be secured while shortening the total length of the lens system. It is more preferable for the upper limit of Conditional Formula (4-1) below to be satisfied, and even more preferable for the upper limit of Conditional Formula (4-2) below to be satisfied, in order to cause this advantageous effect to become more prominent. In addition, it is preferable for the distance TTL along the optical axis from the surface of the first lens L1 toward the object side to the image formation plane to be secured such that the value of TTL/f is not less than or equal to the lower limit defined in Conditional Formula (4-1). In this case, correction of various aberrations, particularly field curvature and distortion, will be facilitated, while shortening the total length of the lens system. It is more preferable for the lower limit defined in Conditional Formula (4-2) to be satisfied in order to cause this advantageous effect to become more prominent.

$$0.8 < TTL/f < 2 \qquad (4\text{-}1)$$

$$1 < TTL/f < 1.8 \qquad (4\text{-}2)$$

In addition, it is preferable for the combined focal length f12 of the first lens L1 and the second lens L2 and the focal length f of the entire system to satisfy Conditional Formula (5) below.

$$0.4 < f/f12 < 1.25 \qquad (5)$$

Conditional Formula (5) defines a preferable range of numerical values for the ratio of the focal length f of the entire system with respect to the combined focal length f12 of the first lens L1 and the second lens L2. By securing the combined refractive power of the first lens L1 and the second lens L2 such that the value of f/f12 is not less than or equal to the lower limit defined in Conditional Formula (5), the combined refractive power of the first lens L1 and the second lens L2 will not be excessively weak with respect to the refractive power of the entire system. As a result, the total length of the lens system can be favorably shortened. By maintaining the combined refractive power of the first lens L1 and the second lens L2 such that the value of f/f12 is not greater than or equal to the upper limit defined in Conditional Formula (5), the combined refractive power of the first lens L1 and the second lens L2 will not be excessively strong with respect to the refractive power of the entire system. As a result, the generation of spherical aberration can be suppressed, which is favorable. It is more preferable for Conditional Formula (5-1) to be satisfied, in order to cause these advantageous effects to become more prominent.

$$0.7 < f/f12 < 1.2 \qquad (5\text{-}1)$$

In addition, it is preferable for the focal length f of the entire system and the focal length f5 of the fifth lens L5 to satisfy Conditional Formula (6) below.

$$1.1 < f/f5 < 1.95 \qquad (6)$$

Conditional Formula (6) defines the preferred range of numerical values for the ratio of the focal length f of the entire system with respect to the focal length f5 of the fifth lens L5. By securing the refractive power of the fifth lens L5 such that the value of f/f5 is not less than or equal to the lower limit defined in Conditional Formula (6), the positive refractive power of the fifth lens L5 will not become excessively weak with respect to the refractive power of the entire system. As a result, the total length of the lens system can be favorably shortened. By maintaining the refractive power of the fifth lens L5 such that the value of f/f5 is not greater than or equal to the upper limit defined in Conditional Formula (6), the positive refractive power of the fifth lens L5 will not become excessively strong with respect to the refractive power of the entire system. As a result, distortion can be favorably corrected. It is more preferable for Conditional Formula (6-1) below to be satisfied, in order to cause these advantageous effects to become more prominent.

$$1.3 < f/f5 < 1.95 \qquad (6\text{-}1)$$

In addition, it is preferable for the focal length f of the entire system and the focal length f2 of the second lens L2 to satisfy Conditional Formula (7) below.

$$0.7 < f/f2 < 1.8 \qquad (7)$$

Conditional Formula (7) defines the preferred range of numerical values for the ratio of the focal length f of the entire system with respect to the focal length f2 of the second lens L2. By securing the refractive power of the second lens L2 such that the value of f/f2 is not less than or equal to the lower limit defined in Conditional Formula (7), the positive refractive power of the second lens L2 will not become excessively weak with respect to the refractive power of the entire system. As a result, the total length of the lens system can be favorably shortened. By maintaining the refractive power of the second lens L2 such that the value of f/f2 is not greater than or equal to the upper limit defined in Conditional Formula (7), the positive refractive power of the second lens L2 will not become excessively strong with respect to the refractive power of the entire system. As a result, the generation of spherical aberration can be suppressed, which is favorable. It is more preferable for Conditional Formula (7-1) below to be satisfied, in order to cause these advantageous effects to become more prominent.

$$0.9 < f/f2 < 1.5 \qquad (7\text{-}1)$$

Next, the imaging lenses according to Examples 2 through 6 of the present invention will be described in detail with reference to FIGS. 2 through 6. All of the surfaces of the first lens L1 through the sixth lens L6 are aspherical surfaces in the imaging lenses according to Examples 1 through 6 illustrated in FIGS. 1 through 6. In addition, each of the imaging lenses of Examples 2 through 6 are constituted by a first lens L1 of a meniscus shape with a concave surface toward the image side and having a negative refractive power, a second lens L2, a third lens L3, a fourth lens L4, a fifth lens L5 having a positive refractive power, and a sixth lens L6 having a negative refractive power, a concave surface toward the image side, and at least one inflection point on the surface toward the image side, in this order from the object side, in the same manner as the imaging lens of Example 1. For this reason, only other detailed configurations of each lens that constitutes the imaging lenses of Examples 1 through 6 will be described below. In addition, the operational effects of configurations which are common among Examples 1 through 6 are the same. Therefore, the configurations and operational effects will be described for Examples having lower numbers, and redundant descriptions of the configurations and operational effects which are common among the other embodiments will be omitted.

Figure 2:
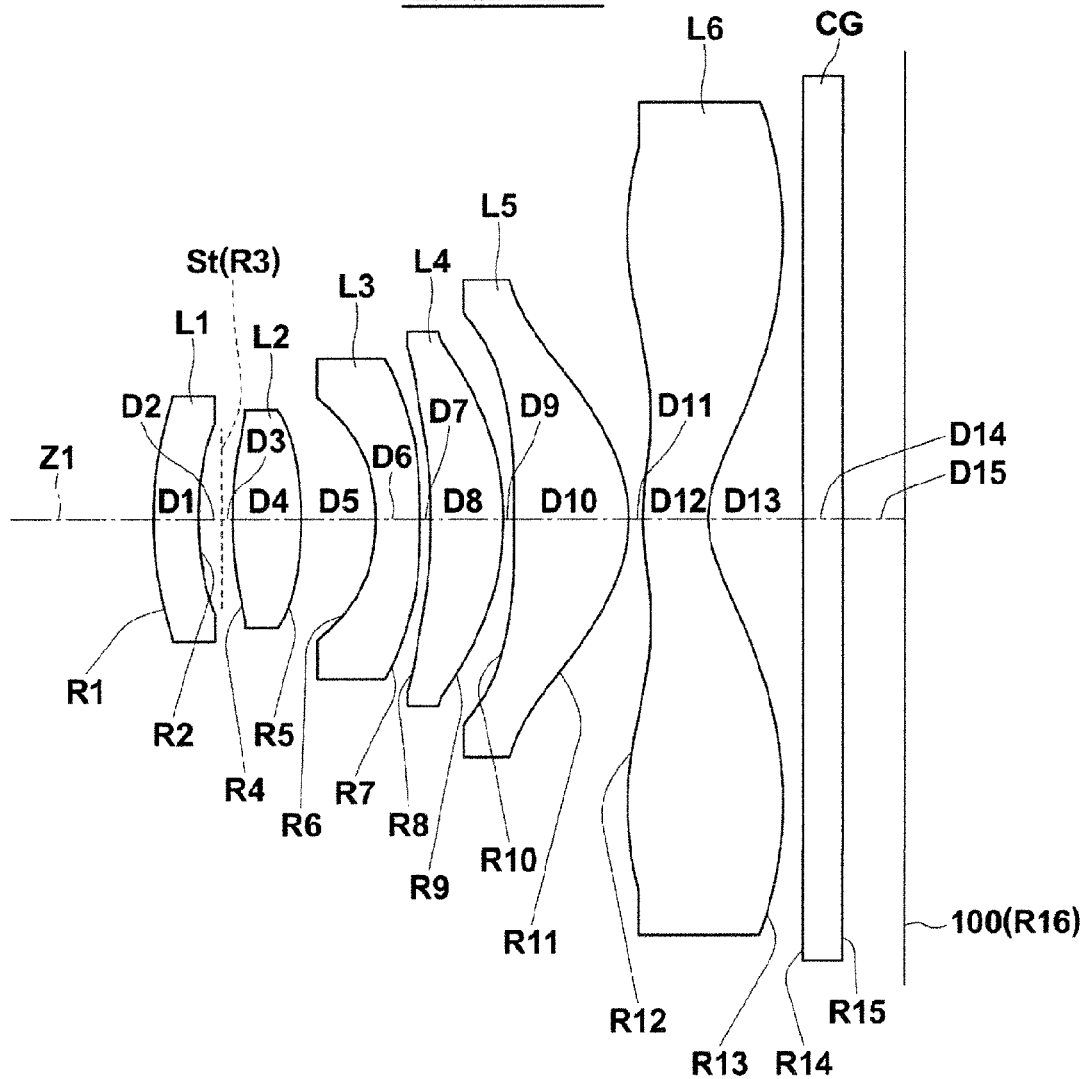
FIG. 2 is a sectional diagram that illustrates a second example of the configuration of an imaging lens according to an embodiment of the present invention, and corresponds to a lens of Example 2.
Figure 3:
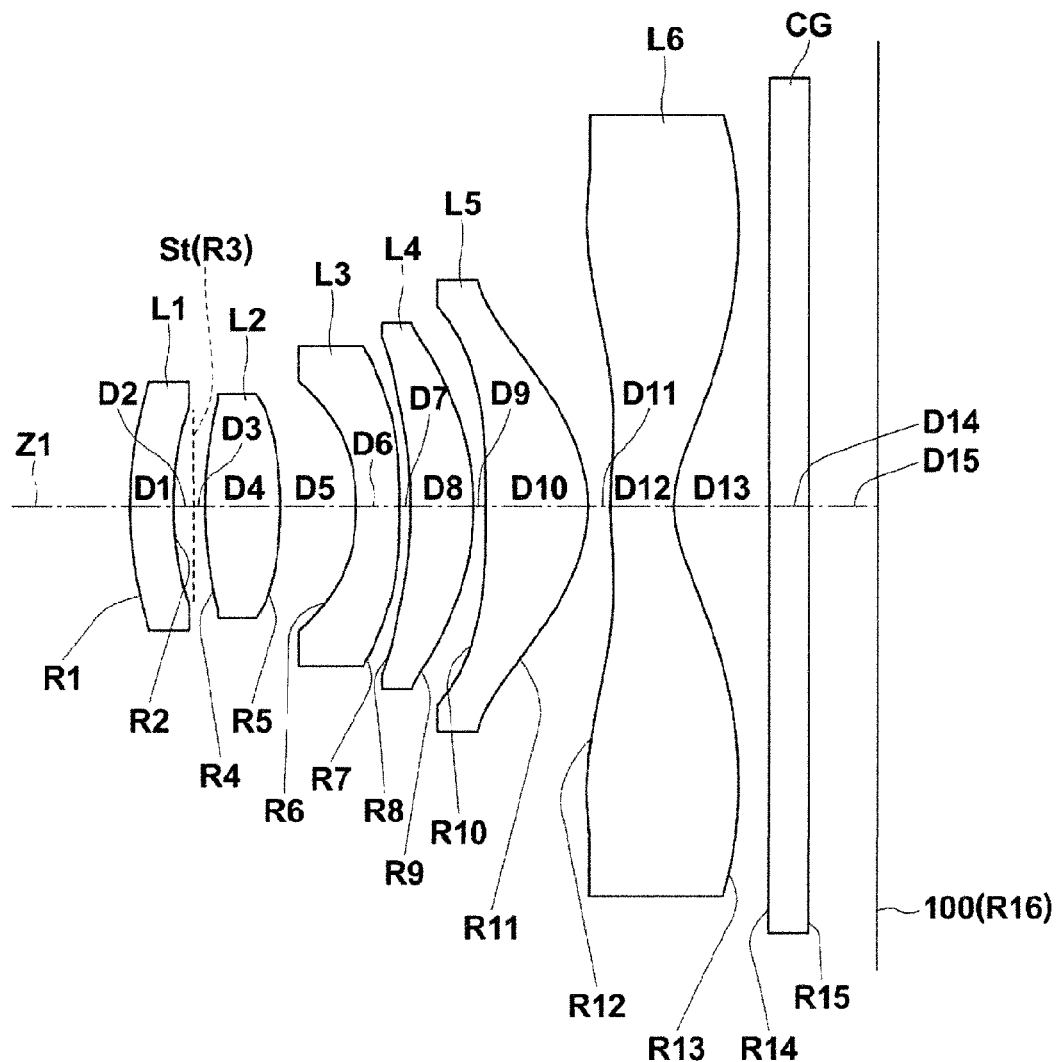
FIG. 3 is a sectional diagram that illustrates a third example of the configuration of an imaging lens according to an embodiment of the present invention, and corresponds to a lens of Example 3.

The first lens L1 through the sixth lens L6 of the imaging lenses L of Examples 2 and 3 illustrated in FIGS. 2 and 3 have the same configurations as those of Example 1. Therefore, the same operational effects are obtained by the configurations of these lenses as those obtained by the corresponding configurations in Example 1.

Figure 4:
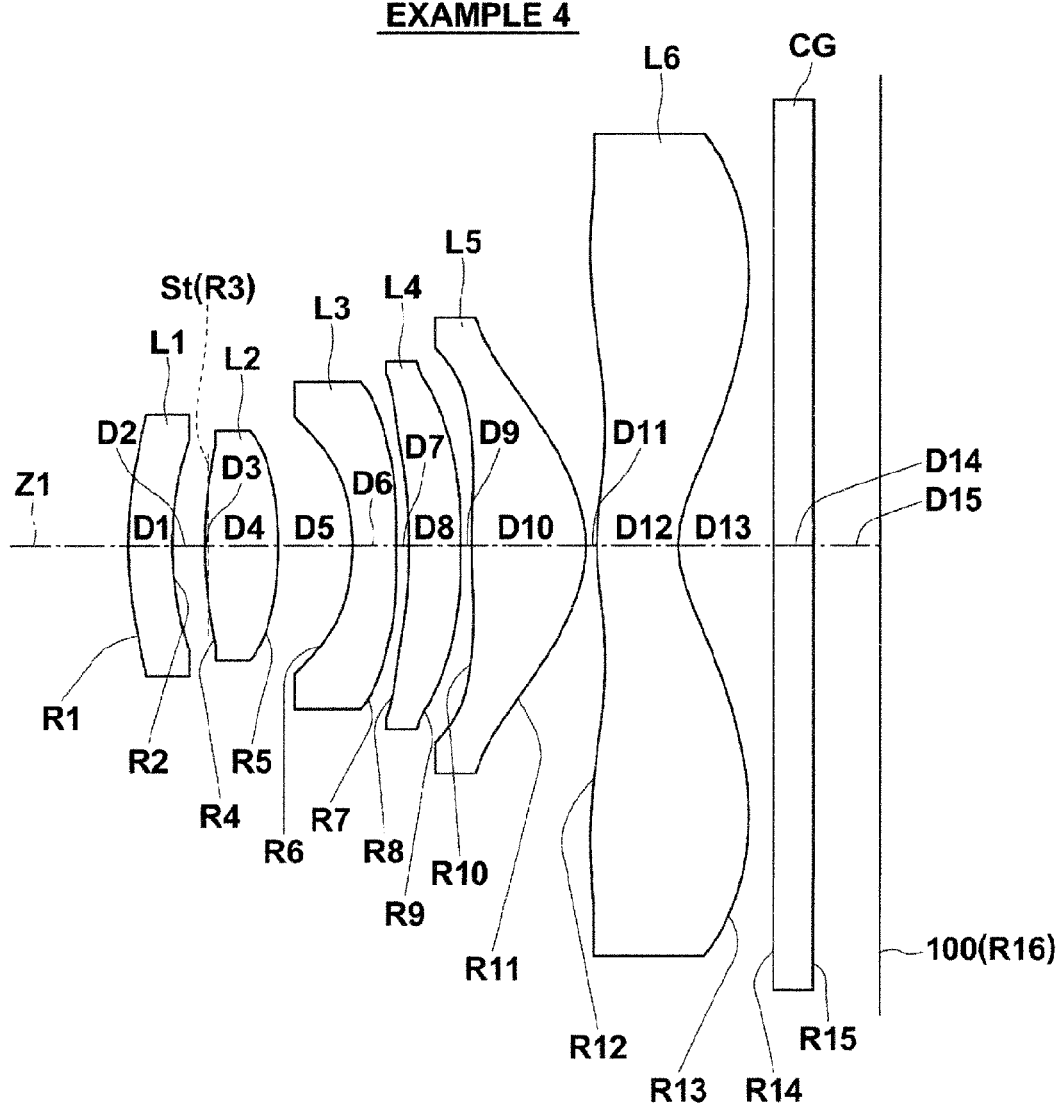
FIG. 4 is a sectional diagram that illustrates a fourth example of the configuration of an imaging lens according to an embodiment of the present invention, and corresponds to a lens of Example 4.
Figure 5:
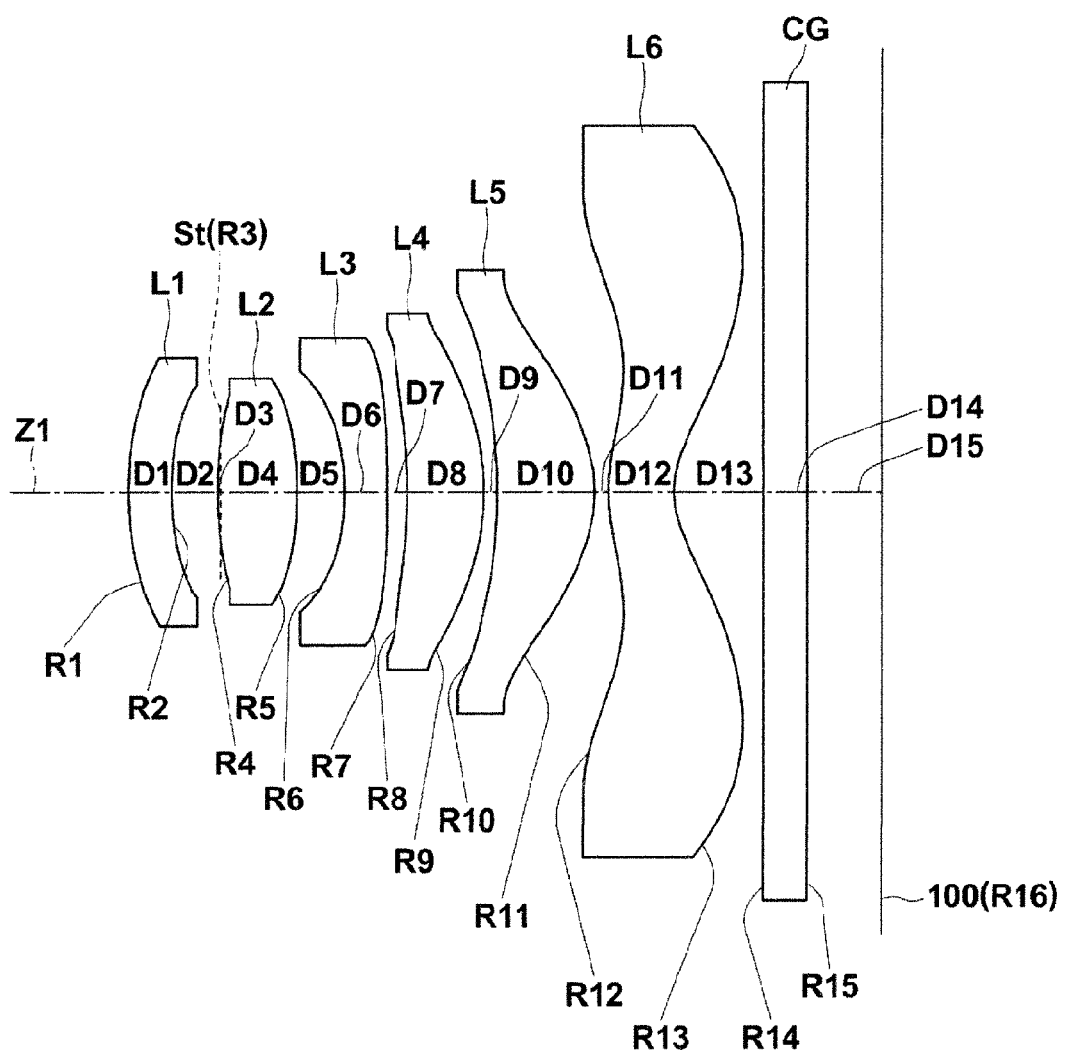
FIG. 5 is a sectional diagram that illustrates a fifth example of the configuration of an imaging lens according to an embodiment of the present invention, and corresponds to a lens of Example 5.

The fourth lens L4 may be a biconcave lens with a surface having a radius of curvature with a small absolute value toward the object side in the vicinity of the optical axis, as in Example 4 illustrated in FIG. 4. In this case, generation of high order spherical aberration can be favorably suppressed. In addition, the first lens L1 through the third lens L3, the fifth lens L5, and the sixth lens L6 of Example 4 have the same configurations as those of Example 1. Therefore, the same operational effects are obtained by the configurations of these lenses as those obtained by the corresponding configurations in Example 1.

The fifth lens L5 may be of a meniscus shape having a convex surface toward the image side in the vicinity of the optical axis, as in Example 5 illustrated in FIG. 5. In this case, astigmatism can be favorably corrected. In addition, the first lens L1 through the fourth lens L4 and the sixth lens L6 of Example 5 have the same configurations as those of Example 1. Therefore, the same operational effects are obtained by the configurations of these lenses as those obtained by the corresponding configurations in Example 1.

Figure 6:
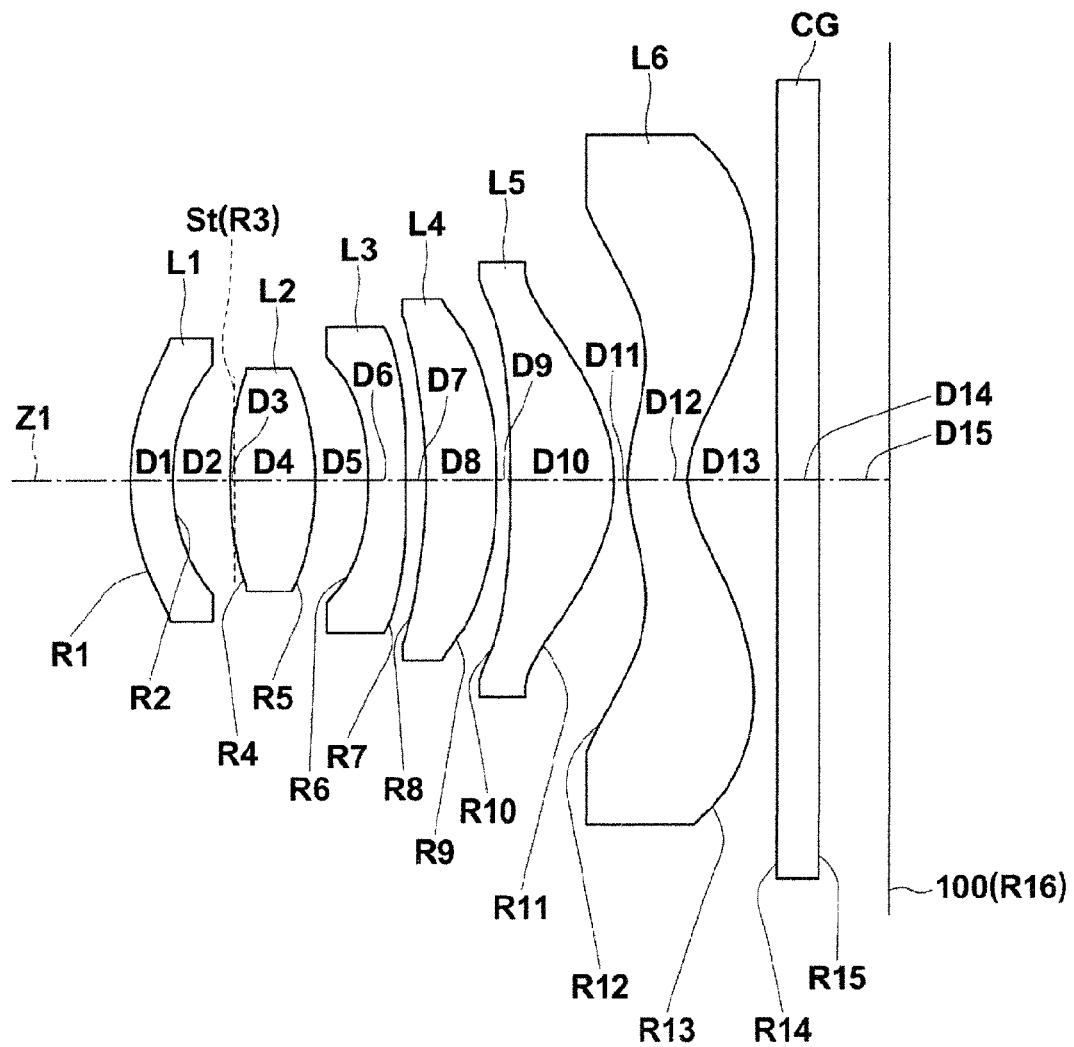
FIG. 6 is a sectional diagram that illustrates a sixth example of the configuration of an imaging lens according to an embodiment of the present invention, and corresponds to a lens of Example 6.
Figure 7:
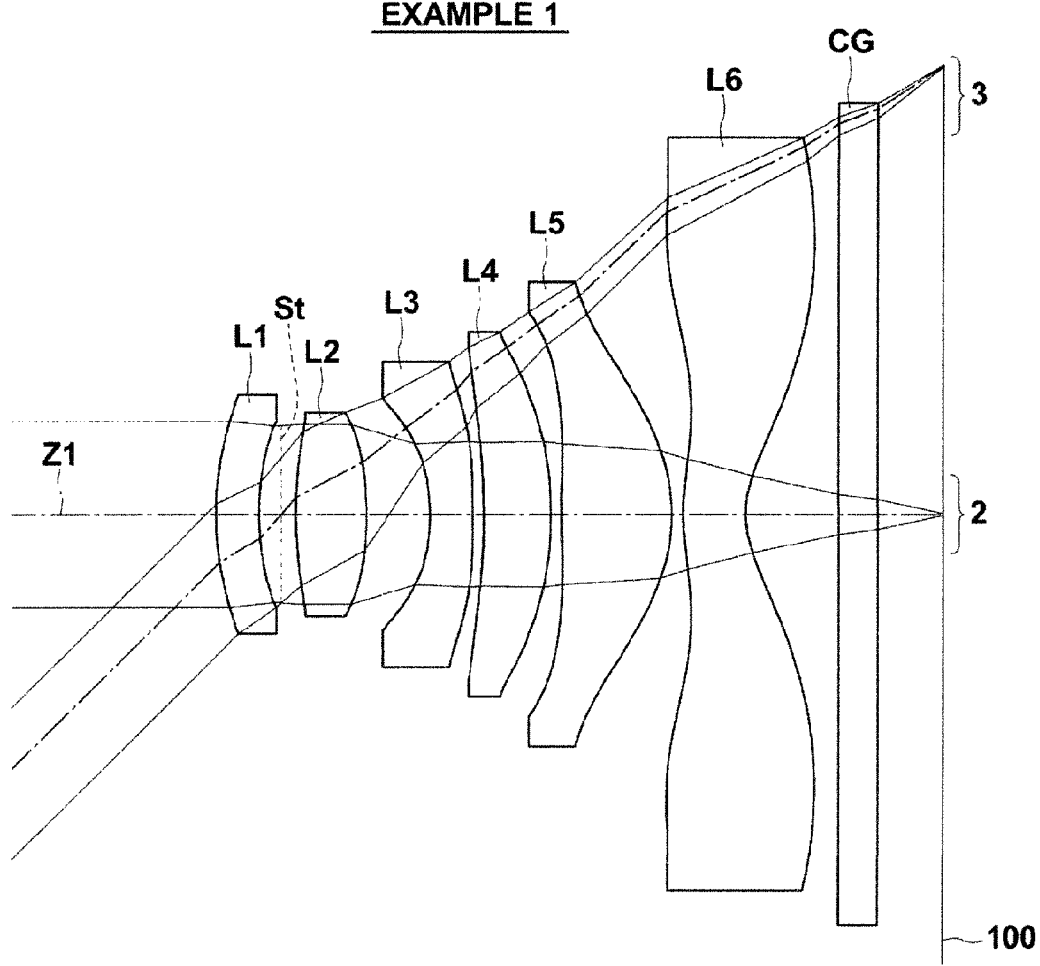
FIG. 7 is a diagram that illustrates the paths of light rays that pass through the imaging lens of FIG. 1.

The fourth lens L4 may be of a meniscus shape having a convex surface toward the image side and a negative refractive power in the vicinity of the optical axis, as in Example 6 illustrated in FIG. 6. In this case, astigmatism can be favorably corrected. In addition, the first lens L1 through the third lens L3, the fifth lens L5, and the sixth lens L6 of Example 6 have the same configurations as those of Example 1. Therefore, the same operational effects are obtained by the configurations of these lenses as those obtained by the corresponding configurations in Example 1.

As has been described above, the configuration of each lens element in a six lens configuration is optimized in the imaging lens according to the present embodiment of the present invention. Therefore, a lens system having a wide angle of view and high imaging performance from a central angle of view through peripheral angles of view, can be realized.

If the lens configurations of each of the first lens L1 through the sixth lens L6 of the imaging lens L are set such that the full angle of view is 80 degrees or greater as in the imaging lenses of Examples 1 through 6, the imaging lens L can be favorably applied to cellular telephones and the like. As a result, it will become possible to meet the demand to obtain images, which are photographed at high resolution with a wide angle of view, and to obtain desired image portions within the photographed images by enlarging the desired image portions.

Further improved imaging performance can be realized by satisfying preferred conditions appropriately. In addition, the imaging apparatuses according to the embodiments of the present invention output image signals corresponding to optical images formed by the high performance imaging lenses according to the embodiments of the present invention. Therefore, images having high resolution from a central angle of view to peripheral angles of view can be obtained.

Next, specific examples of numerical values of the imaging lens of the present invention will be described. A plurality of examples of numerical values will be summarized and explained below.

Table 1 and Table 2 below show specific lens data corresponding to the configuration of the imaging lens illustrated in FIG. 1. Table 1 shows basic lens data of the imaging lens, and Table 2 shows data related to aspherical surfaces. In the lens data of Table 1, ith lens surface numbers that sequentially increase from the object side to the image side, with the lens surface at the most object side designated as first (the aperture stop St being number 1), are shown in the column Si for the imaging lens of Example 1. The radii of curvature (mm) of ith surfaces from the object side corresponding to the symbols Ri illustrated in FIG. 1 are shown in the column Ri. Similarly, the distances between an ith surface and an i+1st surface from the object side along the optical axis Z are shown in the column Di. The refractive indices of jth optical elements from the object side with respect to the d line (wavelength: 587.56 nm) are shown in the column Ndj. The Abbe's numbers of the jth optical elements with respect to the d line are shown in the column vdj. Note that the values of the focal length f (mm) of the entire system and back focus Bf (mm) are shown as data for each lens datum. Note that the back focus Bf is represented as air converted values.

In the imaging lens of Example 1, both of the surfaces of the first lens L1 through the sixth lens L6 are all aspherical in shape. In the basic lens data of Table 1, numerical values of radii of curvature in the vicinity of the optical axis (paraxial radii of curvature) are shown as the radii of curvature of the aspherical surfaces.

Table 2 shows aspherical surface data of the imaging lens of Example 1. In the numerical values shown as the aspherical surface data, the symbol "E" indicates that the numerical value following thereafter is a "power index" having 10 as a base, and that the numerical value represented by the index function having 10 as a base is to be multiplied by the numerical value in front of "E". For example, "1.0E-02" indicates that the numerical value is "$1.0 \cdot 10^{-2}$".

The values of coefficients Ai and KA represented by the aspherical surface shape formula (A) below are shown as the aspherical surface data. In greater detail, Z is the length (mm) of a normal line that extends from a point on the aspherical surface having a height h to a plane (a plane perpendicular to the optical axis) that contacts the peak of the aspherical surface.

$$Z = C \cdot h^2 / \{1 + (1 - KA \cdot C^2 \cdot h^2)^{1/2}\} + \Sigma Ai \cdot h^i \quad (A)$$

wherein: Z is the depth of the aspherical surface (mm), h is the distance from the optical axis to the surface of the lens (height) (mm), C is the paraxial curvature=1/R (R is the paraxial radius of curvature), Ai is an ith ordinal aspherical surface coefficient (i is an integer 3 or greater), and KA is an aspherical surface coefficient.

Specific lens data corresponding to the configurations of the imaging lenses illustrated in FIG. 2 through FIG. 6 are shown in Table 3 through Table 12 as Example 2 through Example 6. In the imaging lenses of Examples 1 through 6, both of the surfaces of the first lens L1 through the sixth lens L6 are all aspherical surfaces.

Figure 8:
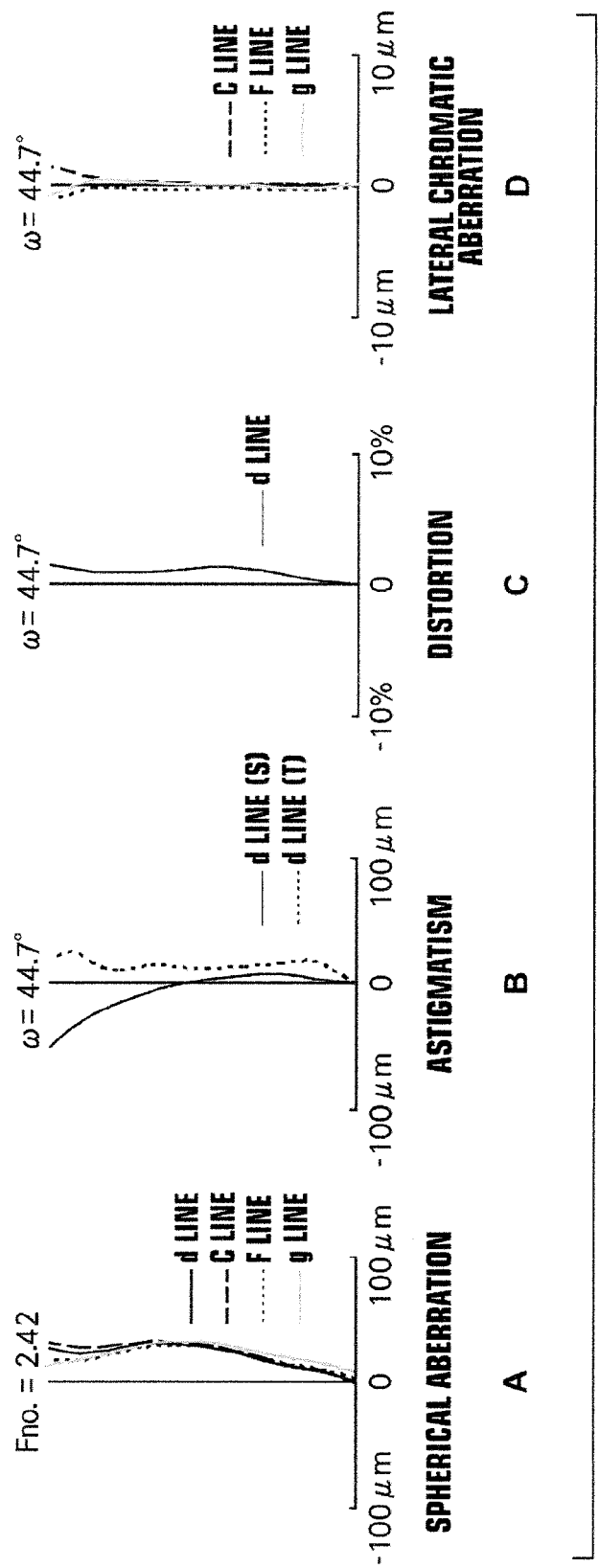
FIG. 8 is a collection of diagrams that illustrate aberrations of the imaging lens of Example 1, wherein A illustrates spherical aberration, B illustrates astigmatic aberration (field curvature), C illustrates distortion, and D illustrates lateral chromatic aberration.

A through D of FIG. 8 are diagrams that illustrate the spherical aberration, the astigmatic aberration, the distortion, and the lateral chromatic aberration of the imaging lens of Example 1, respectively. Each of the diagrams that illustrate the spherical aberration, the astigmatic aberration (field curvature), and the distortion illustrate aberrations using the d line (wavelength: 587.56 nm) as a standard wavelength. The diagrams that illustrate spherical aberration and lateral chromatic aberration, also show aberrations related to the F line (wavelengths: 486.1 nm) and the C line (wavelength: 656.27 nm). In addition, the diagram that illustrates spherical aberration also show aberrations related to the g line (wavelength: 435.83 nm). In the diagrams that illustrate astigmatic aberrations, aberrations in the sagittal direction (S) are indicated by solid lines, while aberrations in the tangential direction (T) are indicated by broken lines. In addition, "Fno." denotes F numbers, and "ω" denotes half angles of view.

Figure 9:
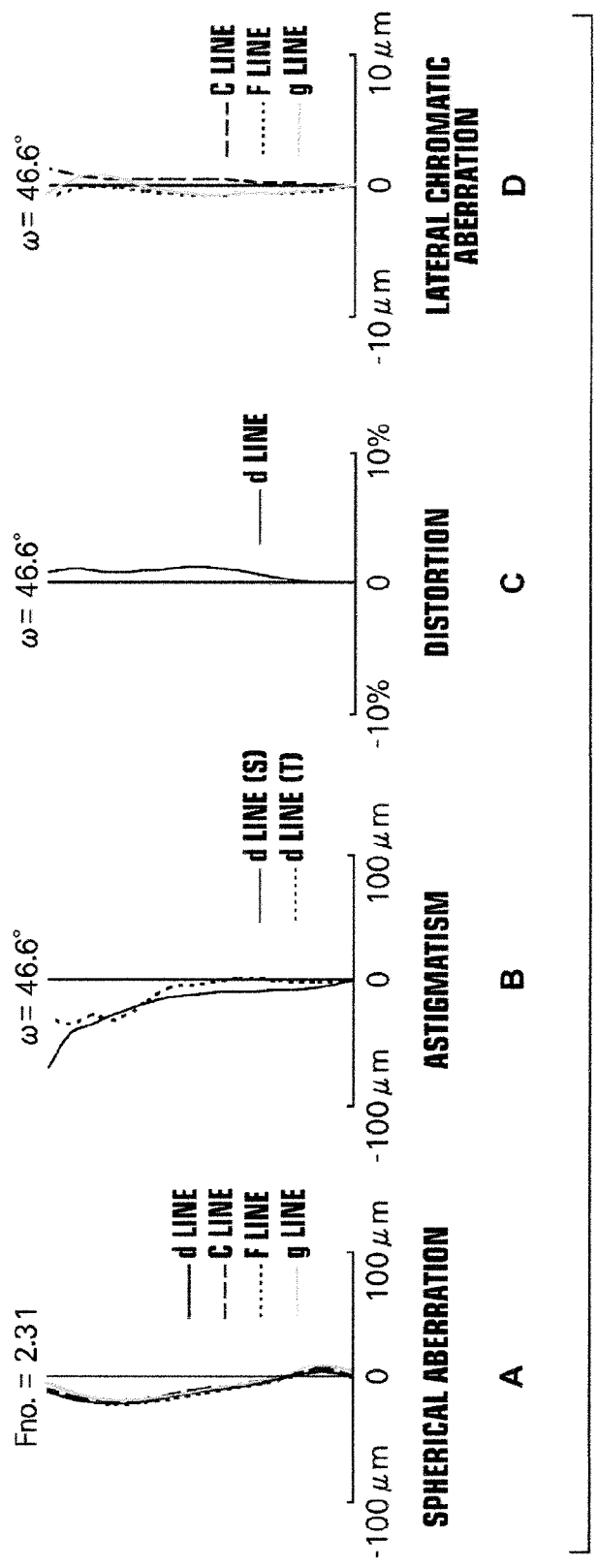
FIG. 9 is a collection of diagrams that illustrate aberrations of the imaging lens of Example 2, wherein A illustrates spherical aberration, B illustrates astigmatic aberration (field curvature), C illustrates distortion, and D illustrates lateral chromatic aberration.
Figure 10:
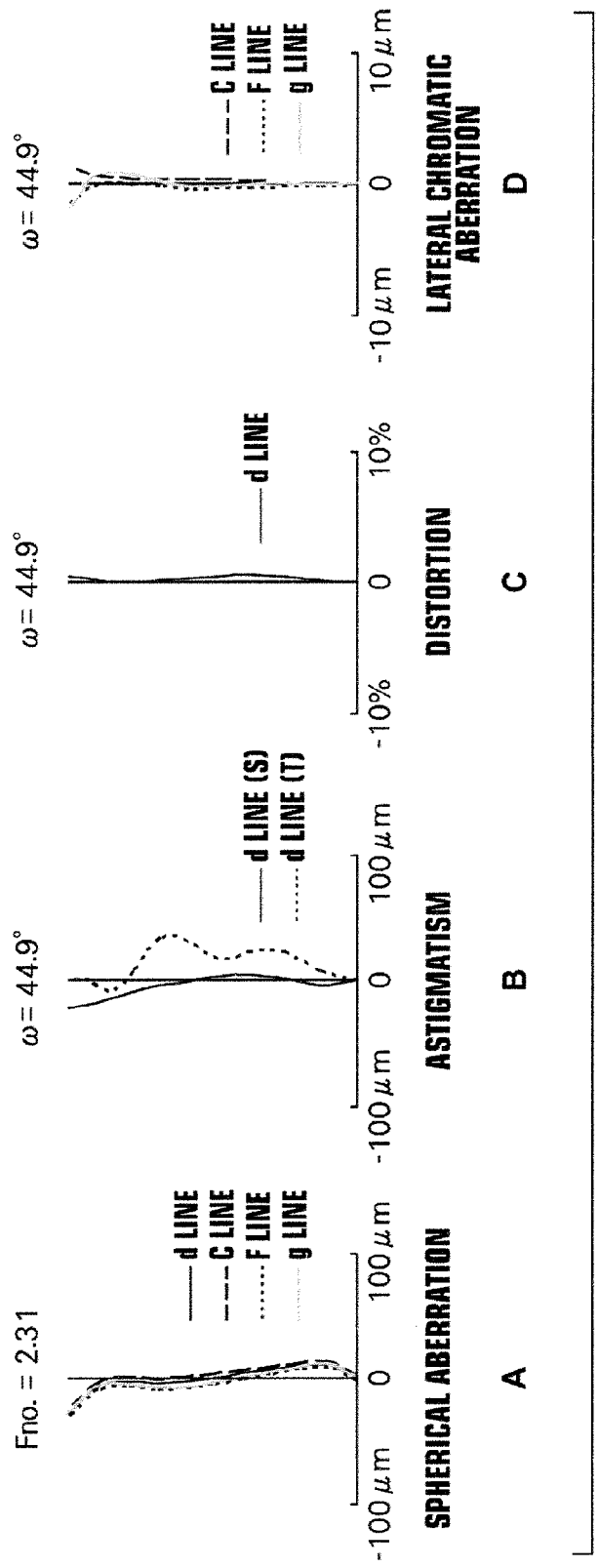
FIG. 10 is a collection of diagrams that illustrate aberrations of the imaging lens of Example 3, wherein A illustrates spherical aberration, B illustrates astigmatic aberration (field curvature), C illustrates distortion, and D illustrates lateral chromatic aberration.
Figure 11:
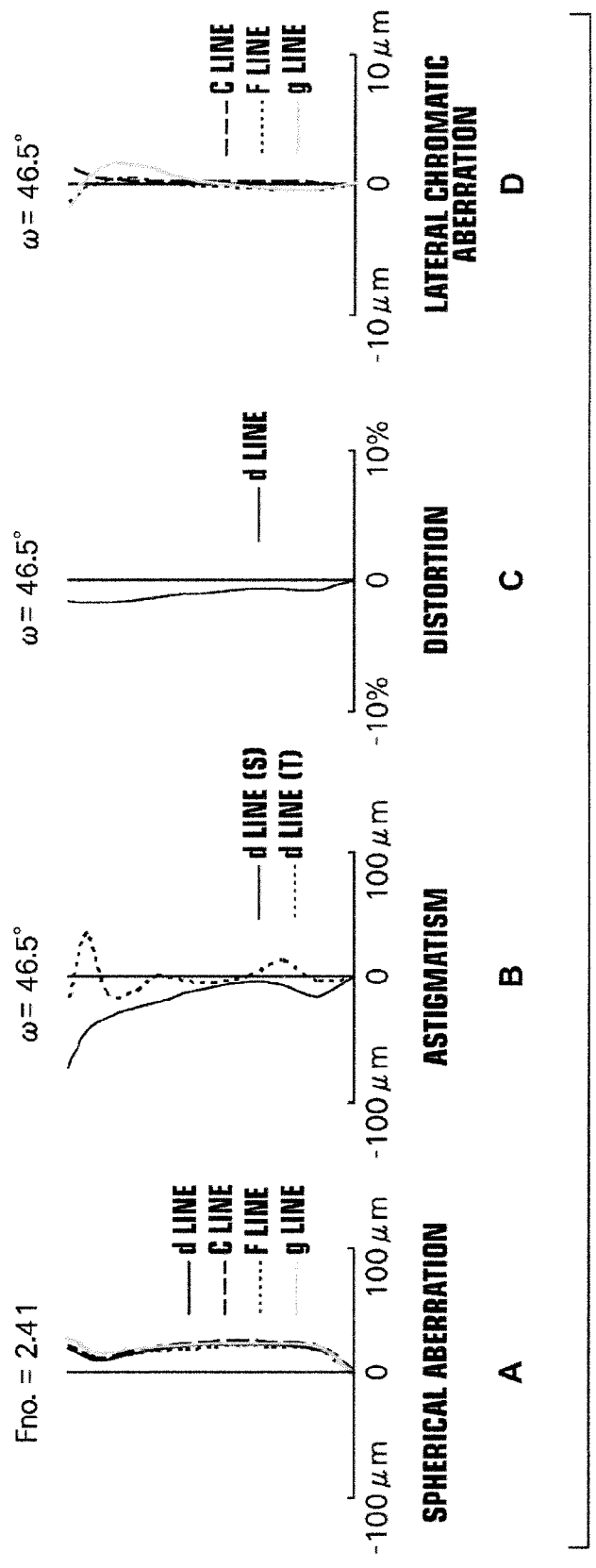
FIG. 11 is a collection of diagrams that illustrate aberrations of the imaging lens of Example 4, wherein A illustrates spherical aberration, B illustrates astigmatic aberration (field curvature), C illustrates distortion, and D illustrates lateral chromatic aberration.
Figure 12:
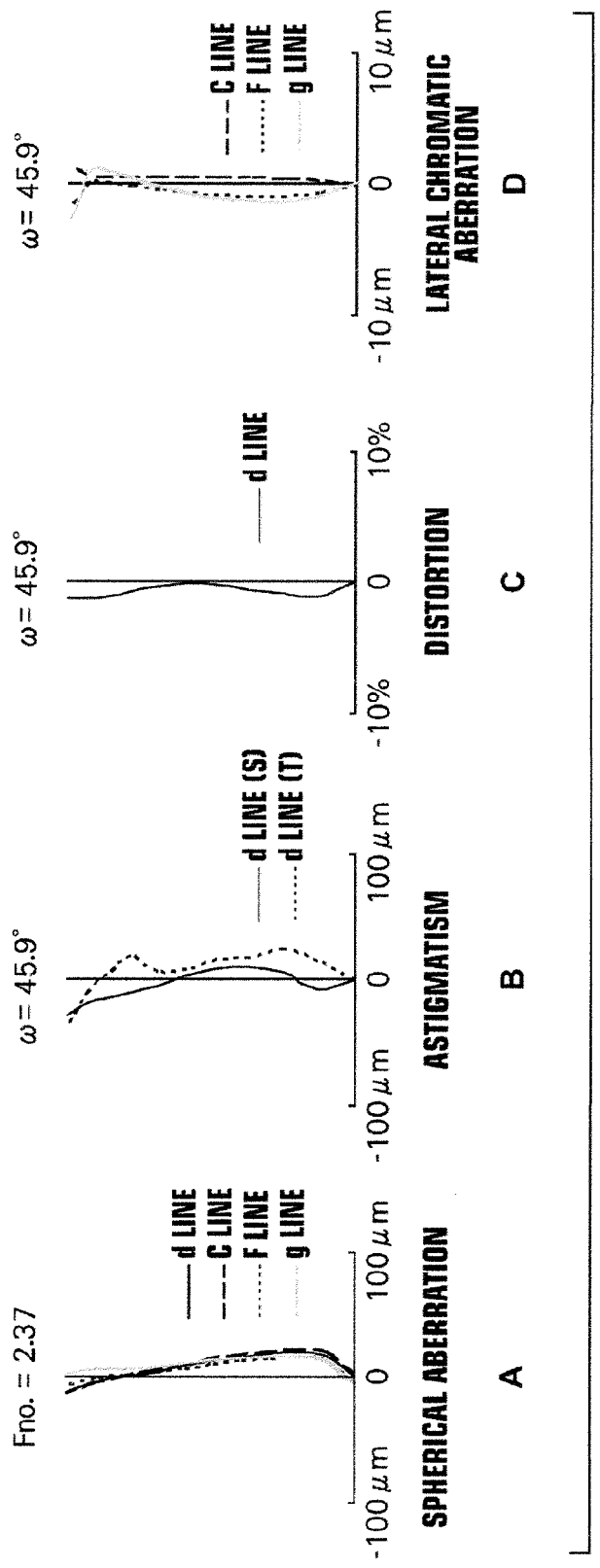
FIG. 12 is a collection of diagrams that illustrate aberrations of the imaging lens of Example 5, wherein A illustrates spherical aberration, B illustrates astigmatic aberration (field curvature), C illustrates distortion, and D illustrates lateral chromatic aberration.
Figure 13:
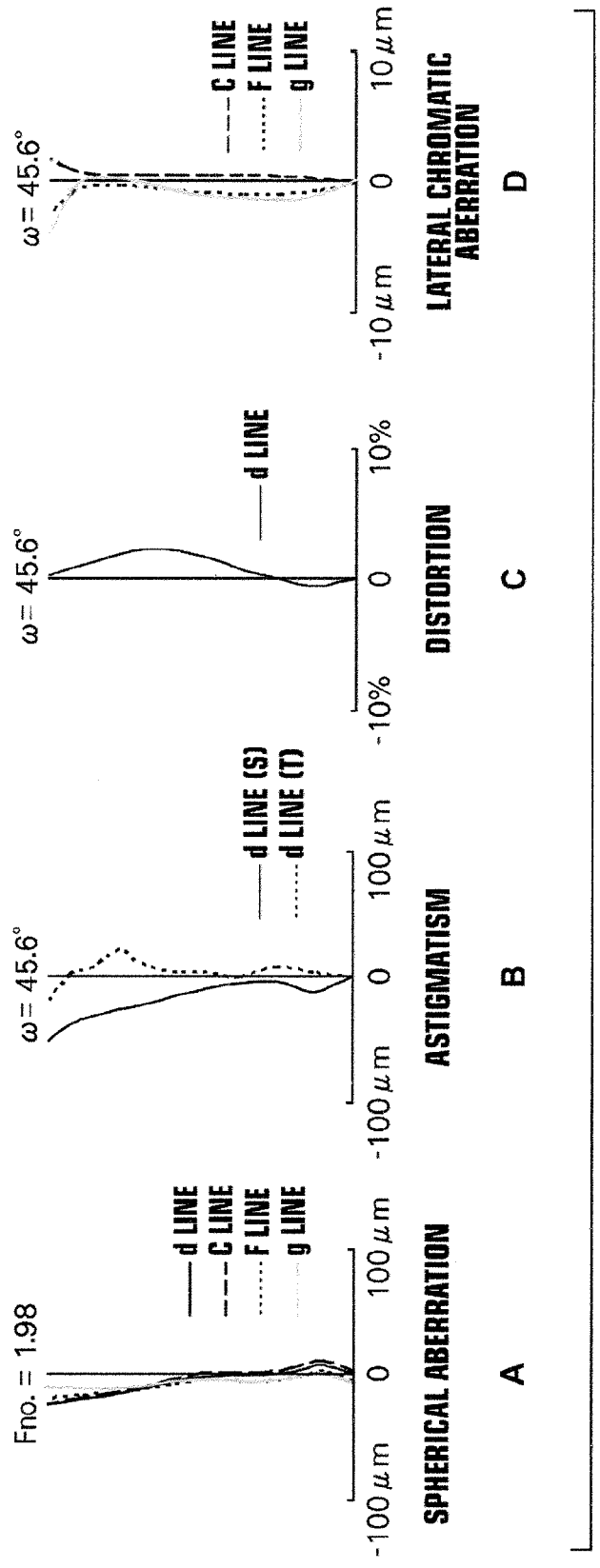
FIG. 13 is a collection of diagrams that illustrate aberrations of the imaging lens of Example 6, wherein A illustrates spherical aberration, B illustrates astigmatic aberration (field curvature), C illustrates distortion, and D illustrates lateral chromatic aberration.

Similarly, the aberrations of the imaging lens of Example 2 through Example 6 are illustrated in A through D of FIG. 9 through A through D of FIG. 13.

Table 13 shows values corresponding to Conditional Formulae (1) through (7) for each of Examples 1 through 6.

As can be understood from each set of numerical value data and from the diagrams that illustrate aberrations, each of the Examples favorably corrects distortion, and simultaneously realizes a wide angle of view and high imaging performance.

Note that the imaging lens of the present invention is not limited to the embodiments and Examples described above, and various modifications are possible. For example, the values of the radii of curvature, the distances among surfaces, the refractive indices, the Abbe's numbers, the aspherical surface coefficients, etc., are not limited to the numerical values indicated in connection with the Examples, and may be other values.

In addition, the Examples are described under the presumption that they are to be utilized with fixed focus. However, it is also possible for configurations capable of adjusting focus to be adopted. It is possible to adopt a configuration, in which the entirety of the lens system is fed out or a portion of the lenses is moved along the optical axis to enable automatic focus, for example.

TABLE 1

Example 1
f = 2.848, Bf = 1.184

| Si | Ri | Di | Ndj | vdj |
|---|---|---|---|---|
| *1 | 2.02783 | 0.275 | 1.54492 | 55.89 |
| *2 | 1.89038 | 0.141 | | |
| 3 (aperture stop) | ∞ | 0.095 | | |
| *4 | 2.77972 | 0.453 | 1.54492 | 55.89 |
| *5 | −2.39615 | 0.409 | | |
| *6 | −1.43864 | 0.275 | 1.63351 | 23.63 |
| *7 | 58.41343 | 0.070 | | |
| *8 | −7.72276 | 0.427 | 1.54492 | 55.89 |
| *9 | −3.92244 | 0.070 | | |
| *10 | 4.38563 | 0.710 | 1.54492 | 55.89 |
| *11 | −1.36314 | 0.070 | | |
| *12 | 1.16982 | 0.400 | 1.53385 | 53.84 |
| *13 | 0.60227 | 0.600 | | |
| 14 | ∞ | 0.250 | 1.51633 | 64.14 |
| 15 | ∞ | 0.419 | | |
| 16 (image forming plane) | ∞ | | | |

*aspherical surface

TABLE 2

Example 1: Aspherical Surface Data

| Surface Number | KA | A3 | A4 | A5 | A6 |
|---|---|---|---|---|---|
| 1 | −2.1046985E+00 | 1.3327566E−02 | −1.6199586E−02 | 2.5857991E−01 | −4.7483609E−01 |
| 2 | −1.7003270E+00 | 2.5621046E−04 | 1.2186468E−01 | 3.4225244E−01 | −5.2389931E−01 |
| 4 | −1.4838640E+01 | −2.3845152E−02 | 2.5146253E−01 | −6.5405076E−01 | 1.0449393E+00 |
| 5 | 2.4789413E+00 | 6.0356981E−03 | −2.1442925E−01 | −4.0040891E−02 | 1.4500629E−01 |
| 6 | −7.1380447E+00 | −5.4597508E−02 | −9.8739035E−01 | 8.8426112E−01 | −1.2713327E+00 |
| 7 | 4.3254146E+01 | −2.1536070E−02 | −1.1558674E+00 | 1.9760595E+00 | −1.4065500E+00 |
| 8 | 2.6958748E+01 | −9.1482718E−02 | −1.3889718E−01 | −4.7733001E−01 | 3.1445047E+00 |
| 9 | −3.3442353E+01 | −2.1977724E−01 | 1.2286109E−01 | −9.2756017E−01 | 1.8749674E+00 |
| 10 | −2.5519331E+01 | −1.4132436E−01 | −1.1315821E−01 | −3.7769555E−02 | 2.6655780E−01 |

TABLE 2-continued

Example 1: Aspherical Surface Data

| | | | | | |
|---|---|---|---|---|---|
| 11 | −5.6947146E+00 | −4.9300821E−01 | 8.1013415E−01 | −7.1777867E−01 | 1.5195774E−01 |
| 12 | −2.1629820E+00 | −4.8749591E−01 | 1.7238351E−01 | −9.8692367E−02 | 2.3013057E−01 |
| 13 | −2.3340356E+00 | 5.2298086E−02 | −4.6578859E−01 | 4.6367271E−01 | −1.6429131E−01 |

| | A7 | A8 | A9 | A10 |
|---|---|---|---|---|
| 1 | 2.0945147E−01 | 5.3273448E−01 | −9.5433722E−01 | 4.3048785E−01 |
| 2 | −2.6942337E+00 | 1.2111551E+01 | −1.8418539E+01 | 1.0612886E+01 |
| 4 | −4.2783800E−01 | −1.6620553E+00 | 2.2922988E+00 | −1.0412780E+00 |
| 5 | −1.7672528E−01 | −7.8149031E−01 | 1.5861007E+00 | −1.0803048E+00 |
| 6 | 6.4920906E−01 | 3.9181128E+00 | −5.9397123E+00 | 2.6216086E+00 |
| 7 | 5.4232231E−01 | −1.8547191E−01 | 2.2219460E−01 | −1.4079301E−01 |
| 8 | −3.9735215E+00 | 9.4810970E−01 | 1.1331768E+00 | −5.5915608E−01 |
| 9 | −8.4467615E−01 | −3.2372165E−01 | −3.7500403E−02 | 2.0004461E−01 |
| 10 | −4.8855664E−03 | −1.3456931E−01 | −5.1790169E−02 | 5.9115918E−02 |
| 11 | 1.4615265E−01 | −1.0746826E−02 | −4.2878549E−02 | 8.9008743E−03 |
| 12 | −1.7521466E−01 | 6.1152159E−02 | −1.0765294E−02 | 8.1415369E−04 |
| 13 | −1.6237276E−02 | 2.9525158E−02 | −8.1718577E−03 | 7.5370487E−04 |

TABLE 3

Example 2
f = 2.816, Bf = 1.153

| Si | Ri | Di | Ndj | νdj |
|---|---|---|---|---|
| *1 | 2.50979 | 0.283 | 1.63351 | 23.63 |
| *2 | 2.28560 | 0.145 | | |
| 3 (aperture stop) | ∞ | 0.070 | | |
| *4 | 2.77972 | 0.432 | 1.54492 | 55.89 |
| *5 | −2.66350 | 0.463 | | |
| *6 | −1.52436 | 0.279 | 1.63351 | 23.63 |
| *7 | 58.41343 | 0.070 | | |
| *8 | −8.02802 | 0.455 | 1.54492 | 55.89 |
| *9 | −2.56893 | 0.070 | | |
| *10 | 19.85376 | 0.716 | 1.54492 | 55.89 |
| *11 | −1.08324 | 0.089 | | |
| *12 | 1.44363 | 0.406 | 1.54492 | 55.89 |
| *13 | 0.61236 | 0.600 | | |
| 14 | ∞ | 0.250 | 1.51633 | 64.14 |
| 15 | ∞ | 0.388 | | |
| 16 (image forming plane) | ∞ | | | |

*aspherical surface

TABLE 4

Example 2: Aspherical Surface Data

| Surface Number | KA | A3 | A4 | A5 | A6 |
|---|---|---|---|---|---|
| 1 | 3.4236784E−01 | 4.7955256E−03 | −2.4378386E−02 | 2.2607401E−01 | −4.7324126E−01 |
| 2 | −4.6185006E+00 | 1.1176244E−02 | 1.3109307E−02 | 7.5273471E−01 | −9.4859337E−01 |
| 4 | −1.3234387E+01 | −2.1956937E−02 | 2.8445023E−01 | −6.3017335E−01 | 1.0297195E+00 |
| 5 | 3.2541427E−01 | 8.5144448E−04 | −1.8308269E−01 | −2.7061386E−03 | 9.6849150E−02 |
| 6 | −5.0499368E+00 | −6.2236975E−02 | −7.6818916E−01 | 7.4329403E−01 | −1.3873223E+00 |
| 7 | −4.4439362E+01 | −8.2784753E−02 | −1.0152364E+00 | 1.8283647E+00 | −1.3795404E+00 |
| 8 | 2.3060852E+01 | −1.2064487E−01 | −2.4264830E−01 | −3.5517199E−01 | 3.1373127E+00 |
| 9 | −1.0425306E+01 | −1.8633609E−01 | 1.1021112E−01 | −9.3255137E−01 | 1.8609904E+00 |
| 10 | −1.0988052E+01 | −1.1799638E−01 | −1.2326347E−01 | −5.0151872E−02 | 2.8171551E−01 |
| 11 | −1.5484252E+00 | −3.3273226E−01 | 7.6108080E−01 | −7.8888196E−01 | 1.6632064E+00 |
| 12 | −3.4522178E+00 | −3.3019415E−01 | 4.6009784E−02 | −6.0976993E−02 | 2.2945714E−01 |
| 13 | −2.3210494E+00 | 2.9029131E−02 | −3.8177116E−01 | 3.8371564E−01 | −1.3510060E−01 |

| | A7 | A8 | A9 | A10 |
|---|---|---|---|---|
| 1 | 1.9299721E−01 | 5.8364712E−01 | −9.3484693E−01 | 3.9708459E−01 |
| 2 | −3.7088050E+00 | 1.5109182E+01 | −2.0672208E+01 | 1.0574733E+01 |
| 4 | −4.5054723E−01 | −1.5054665E+00 | 2.1381310E+00 | −9.1341271E−01 |
| 5 | −2.1906900E−01 | −7.2526701E−01 | 1.7128359E+00 | −1.1977206E+00 |
| 6 | 5.4151265E−01 | 3.8217159E+00 | −5.9512881E+00 | 2.7145766E+00 |
| 7 | 5.5628169E−01 | −1.7899172E−01 | 2.2183639E−01 | −1.5912357E−01 |
| 8 | −3.9807663E+00 | 9.4764224E−01 | 1.1306200E+00 | −5.6550129E−01 |
| 9 | −8.4121443E−01 | −3.2098683E−01 | −3.5620722E−02 | 1.9828820E−01 |

TABLE 4-continued

Example 2: Aspherical Surface Data

| | | | | |
|---|---|---|---|---|
| 10 | −8.4151524E−03 | −1.3735066E−01 | −5.3131096E−02 | 6.0620174E−02 |
| 11 | 1.6024510E−01 | −7.4227688E−03 | −4.2807336E−02 | 7.3680579E−03 |
| 12 | −1.7848173E−01 | 6.1173122E−02 | −1.0003878E−02 | 6.3581497E−04 |
| 13 | −1.6901303E−02 | 2.7527150E−02 | −7.8636367E−03 | 7.6244112E−04 |

TABLE 5

Example 3
f = 2.996, Bf = 1.204

| Si | Ri | Di | Ndj | vdj |
|---|---|---|---|---|
| *1 | 2.55207 | 0.275 | 1.63351 | 23.63 |
| *2 | 2.41639 | 0.130 | | |
| 3 (aperture stop) | ∞ | 0.070 | | |
| *4 | 2.77972 | 0.472 | 1.54492 | 55.89 |
| *5 | −2.97553 | 0.477 | | |
| *6 | −1.60013 | 0.275 | 1.63351 | 23.63 |
| *7 | 58.41343 | 0.070 | | |
| *8 | −6.21557 | 0.396 | 1.54492 | 55.89 |
| *9 | −2.37418 | 0.078 | | |
| *10 | 16.37919 | 0.645 | 1.54492 | 55.89 |
| *11 | −1.08308 | 0.141 | | |
| *12 | 2.17365 | 0.400 | 1.54492 | 55.89 |
| *13 | 0.71145 | 0.600 | | |
| 14 | ∞ | 0.250 | 1.51633 | 64.14 |
| 15 | ∞ | 0.439 | | |
| 16 (image forming plane) | ∞ | | | |

*aspherical surface

TABLE 7

Example 4
f = 2.888, Bf = 1.180

| Si | Ri | Di | Ndj | vdj |
|---|---|---|---|---|
| *1 | 2.78497 | 0.275 | 1.63351 | 23.63 |
| *2 | 2.50107 | 0.220 | | |
| 3 (aperture stop) | ∞ | −0.020 | | |
| *4 | 2.77972 | 0.458 | 1.54492 | 55.89 |
| *5 | −2.62973 | 0.466 | | |
| *6 | −1.71139 | 0.275 | 1.63351 | 23.63 |
| *7 | 58.41343 | 0.079 | | |
| *8 | −6.66998 | 0.320 | 1.54492 | 55.89 |
| *9 | 100.04106 | 0.070 | | |
| *10 | 4.02789 | 0.715 | 1.54492 | 55.89 |
| *11 | −0.98834 | 0.070 | | |
| *12 | 1.69746 | 0.507 | 1.54492 | 55.89 |
| *13 | 0.66004 | 0.600 | | |
| 14 | ∞ | 0.250 | 1.51633 | 64.14 |
| 15 | ∞ | 0.415 | | |
| 16 (image forming plane) | ∞ | | | |

*aspherical surface

TABLE 6

Example 3: Aspherical Surface Data

| Surface Number | KA | A3 | A4 | A5 | A6 |
|---|---|---|---|---|---|
| 1 | 1.4436471E−02 | −4.0665152E−03 | −3.3714155E−02 | 2.2573666E−01 | −4.6800891E−01 |
| 2 | −5.5160018E+00 | 6.2201425E−03 | −1.3578009E−02 | 7.1760324E−01 | −9.7663917E−01 |
| 4 | −1.2437747E+01 | −2.5644617E−02 | 2.7693403E−01 | −6.4966757E−01 | 1.0019489E+00 |
| 5 | 1.3579029E−01 | 2.2766328E−03 | −1.8051820E−01 | 3.1215774E−03 | 1.0260676E−01 |
| 6 | −5.2878637E+00 | −5.5851446E−02 | −7.3820176E−01 | 7.5757870E−01 | −1.3742338E+00 |
| 7 | −5.0000009E+00 | −9.3257124E−02 | −1.0219489E+00 | 1.8298823E+00 | −1.3790737E+00 |
| 8 | 2.0610525E+01 | −1.2937049E−01 | −2.3328629E−01 | −3.5613778E−01 | 3.1363791E+00 |
| 9 | −1.2179338E+01 | −1.6678994E−01 | 1.0451027E−01 | −9.3347604E−01 | 1.8608111E+00 |
| 10 | −4.6388769E+01 | −1.2706680E−01 | −1.2119665E−01 | −5.1164961E−02 | 2.8155381E−01 |
| 11 | −1.4422319E+00 | −3.2573990E−02 | 7.5979481E−02 | −1.8468663E−01 | 1.6746444E−01 |
| 12 | −2.3699678E+00 | −3.2036975E−01 | 5.0940062E−02 | −6.6519033E−02 | 2.2904326E−01 |
| 13 | −2.9770477E+00 | 4.1308481E−02 | −3.8153403E−01 | 3.8237445E−01 | −1.3524578E−01 |

| | A7 | A8 | A9 | A10 |
|---|---|---|---|---|
| 1 | 1.9948274E−01 | 5.9309597E−01 | −9.2383850E−01 | 3.8331847E−01 |
| 2 | −3.6875016E+00 | 1.5247604E+01 | −2.0294338E+01 | 9.7055228E+00 |
| 4 | −4.4483844E−01 | −1.4474210E+00 | 2.3470907E+00 | −1.1909512E+00 |
| 5 | −2.1366117E−01 | −7.1230535E−01 | 1.7279465E+00 | −1.1735716E+00 |
| 6 | 5.6083293E−01 | 3.8372045E+00 | −5.9335989E+00 | 2.6679003E+00 |
| 7 | 5.5650432E−01 | −1.7814926E−01 | 2.2331641E−01 | −1.5605417E−01 |
| 8 | −3.9809999E+00 | 9.4704629E−01 | 1.1298323E+00 | −5.6680793E−01 |
| 9 | −8.4117569E−01 | −3.2163284E−01 | −3.5717975E−02 | 1.9832979E−01 |
| 10 | −8.1425202E−03 | −1.3708264E−01 | −5.3132467E−02 | 6.0287418E−02 |
| 11 | 1.6063432E−01 | −7.3343017E−03 | −4.3030323E−02 | 7.1856483E−03 |
| 12 | −1.7811623E−01 | 6.1223608E−02 | −9.9887308E−03 | 6.2595684E−04 |
| 13 | −1.6862079E−02 | 2.7580667E−02 | −7.8584591E−03 | 7.5621825E−04 |

TABLE 8

Example 4: Aspherical Surface Data

| Surface Number | KA | A3 | A4 | A5 | A6 |
|---|---|---|---|---|---|
| 1 | −1.0168903E+00 | 7.0943423E−04 | −4.1362227E−02 | 2.2262497E−01 | −4.7588984E−01 |
| 2 | −6.0562391E+00 | 1.3083403E−02 | −4.0887366E−02 | 7.2266838E−01 | −9.6797873E−01 |
| 4 | −1.0476225E+01 | −3.9312849E−02 | 2.7709486E−01 | −6.4918688E−01 | 9.8077679E−01 |
| 5 | −9.9449394E−01 | 6.9908004E−04 | −1.8645421E−01 | 5.5978947E−04 | 9.6963286E−02 |
| 6 | −5.8323205E+00 | −5.0877010E−02 | −7.2096239E−01 | 7.6197520E−01 | −1.3844374E+00 |
| 7 | 4.9334840E+01 | −1.0095959E−02 | −1.0444481E+00 | 1.8219311E+00 | −1.3816693E+00 |
| 8 | 1.9511756E+01 | −1.0863742E−01 | −2.2058305E−01 | −3.5468442E−01 | 3.1371862E+00 |
| 9 | 5.0000024E+01 | −2.3758470E−01 | 1.1089749E−01 | −9.3216860E−01 | 1.8604655E+00 |
| 10 | −2.5862713E+01 | −1.0217054E−01 | −1.3596677E−01 | −5.1997229E−02 | 2.8123902E−01 |
| 11 | −1.2608919E+00 | −3.0055803E−01 | 7.7660357E−01 | −7.9012195E−01 | 1.6455294E−01 |
| 12 | −2.9617889E+00 | −2.6119534E−01 | 2.2377837E−02 | −7.0271033E−02 | 2.3020893E−01 |
| 13 | −2.6887776E+00 | 2.7987950E−02 | −3.5401624E−01 | 3.6596321E−01 | −1.3444145E−01 |

| | A7 | A8 | A9 | A10 |
|---|---|---|---|---|
| 1 | 1.9507864E−01 | 5.9045988E−01 | −9.0562026E−01 | 3.7700151E−01 |
| 2 | −3.7128847E+00 | 1.5172860E+01 | −2.0393657E+01 | 9.9970287E+00 |
| 4 | −5.6238018E−01 | −1.6567907E+00 | 3.6822159E+00 | −2.4953782E+00 |
| 5 | −2.2314406E−01 | −6.9010726E−01 | 1.6565018E+00 | −1.1171070E+00 |
| 6 | 5.4045932E−01 | 3.8110848E+00 | −5.9497554E+00 | 2.7189931E+00 |
| 7 | 5.5517088E−01 | −1.8059901E+00 | 2.1874382E−01 | −1.6915270E−01 |
| 8 | −3.9829934E+00 | 9.4351492E−01 | 1.1273319E+00 | −5.6593853E−01 |
| 9 | −8.4197002E−01 | −3.2136838E−01 | −3.4359909E−02 | 2.0018952E−01 |
| 10 | −8.9224255E−03 | −1.3843268E−01 | −5.4654004E−02 | 5.8617666E−02 |
| 11 | 1.5891352E−01 | −8.3114808E−03 | −4.3187161E−02 | 7.3241576E−03 |
| 12 | −1.7711406E−01 | 6.1185830E−02 | −1.0051485E−02 | 6.2475922E−04 |
| 13 | −1.5560453E−02 | 2.7548718E−02 | −8.0011039E−03 | 7.7793132E−04 |

TABLE 9

Example 5
f = 2.584, Bf = 1.128

| Si | Ri | Di | Ndj | vdj |
|---|---|---|---|---|
| *1 | 2.20515 | 0.250 | 1.63351 | 23.63 |
| *2 | 1.97194 | 0.284 | | |
| 3 (aperture stop) | ∞ | −0.018 | | |
| *4 | 2.43954 | 0.465 | 1.54492 | 55.89 |
| *5 | −2.53251 | 0.273 | | |
| *6 | −1.96357 | 0.250 | 1.63351 | 23.63 |
| *7 | 51.26493 | 0.116 | | |
| *8 | −4.23525 | 0.448 | 1.54492 | 55.89 |
| *9 | −1.97289 | 0.080 | | |
| *10 | −3.87904 | 0.562 | 1.54492 | 55.89 |
| *11 | −0.94287 | 0.080 | | |
| *12 | 1.07983 | 0.380 | 1.54492 | 55.89 |
| *13 | 0.50926 | 0.527 | | |
| 14 | ∞ | 0.250 | 1.51633 | 64.14 |
| 15 | ∞ | 0.437 | | |
| 16 (image forming plane) | ∞ | | | |

*aspherical surface

TABLE 10

Example 5: Aspherical Surface Data

| Surface Number | KA | A3 | A4 | A5 | A6 |
|---|---|---|---|---|---|
| 1 | 3.1058079E+00 | −1.0460264E−02 | 3.7661989E−02 | 3.3941097E−01 | −9.0450695E−01 |
| 2 | −2.8852828E+00 | 3.2368654E−02 | −7.0648048E−02 | 1.5668551E+00 | −2.0565236E+00 |
| 4 | −9.0408152E+00 | −2.5474340E−02 | 3.4156395E−01 | −9.7986518E−01 | 2.0504349E+00 |
| 5 | −1.8623376E+00 | 1.1085741E−02 | −2.9341977E−01 | 2.0759878E−02 | 3.2086033E−01 |
| 6 | −6.6497647E+00 | −2.3364908E−02 | −9.0830733E−01 | 1.3656774E+00 | −2.6864726E+00 |
| 7 | 4.9971319E+01 | 9.9300980E−02 | −1.4562364E+00 | 3.0032312E+00 | −2.6890356E+00 |
| 8 | 8.6721186E+00 | 5.3270847E−02 | −5.0980471E−01 | −6.0238537E−01 | 6.0543851E+00 |
| 9 | −1.4105488E+00 | −9.8317420E−02 | −1.4479090E−02 | −1.4396622E+00 | 3.6114750E+00 |
| 10 | −3.0898838E+01 | −2.5518311E−02 | −1.5379737E−01 | −1.2118823E+00 | 5.4305797E−01 |
| 11 | −1.0755840E−01 | −2.0596253E−01 | 1.1076707E+00 | −1.3572560E+00 | 3.1532441E−01 |
| 12 | −2.6367476E+00 | −1.3466160E−01 | −3.0757132E−01 | −4.3076854E−02 | 4.7451052E−01 |
| 13 | −1.9416425E+00 | 5.9162027E−03 | −5.2395045E−01 | 5.9918110E−01 | −2.4260360E−01 |

| | A7 | A8 | A9 | A10 |
|---|---|---|---|---|
| 1 | 4.3871999E−01 | 1.5590898E+00 | −2.4029640E+00 | 8.9385938E−01 |
| 2 | −8.5577531E+00 | 3.7421034E+01 | −5.3183063E+01 | 2.6931990E+01 |
| 4 | −9.7059908E−01 | −4.5336827E+00 | 8.3616791E+00 | −4.7691470E+00 |
| 5 | −3.3937443E−01 | −1.7588309E+00 | 4.2451708E+00 | −3.1457815E+00 |

TABLE 10-continued

Example 5: Aspherical Surface Data

| | | | | |
|---|---|---|---|---|
| 6 | 1.1135075E+00 | 9.5164298E+00 | −1.6988976E+01 | 8.1474674E+00 |
| 7 | 1.1809251E+00 | −5.0022254E−01 | 5.9909498E−01 | −4.6380248E−01 |
| 8 | −8.6954560E+00 | 2.3785652E+00 | 3.2139045E+00 | −1.8833616E+00 |
| 9 | −1.8349380E+00 | −8.0611778E−01 | −1.1407184E−01 | 6.1777250E−01 |
| 10 | −1.2711760E−02 | −3.4240970E−01 | −1.5108362E−01 | 1.9886031E−01 |
| 11 | 3.4722018E−01 | −1.9829287E−02 | −1.1977534E−01 | 2.8110560E−02 |
| 12 | −3.8405590E−01 | 1.4893782E−01 | −3.0196171E−02 | 2.4156962E−03 |
| 13 | −3.3032321E−02 | 6.6019260E−02 | −2.3193192E−02 | 2.8679642E−03 |

TABLE 11

Example 6
f = 2.576, Bf = 1.108

| Si | Ri | Di | Ndj | vdj |
|---|---|---|---|---|
| *1 | 1.58688 | 0.250 | 1.63351 | 23.63 |
| *2 | 1.32726 | 0.367 | | |
| 3 (aperture stop) | ∞ | −0.030 | | |
| *4 | 2.43954 | 0.500 | 1.54492 | 55.89 |
| *5 | −2.14381 | 0.315 | | |
| *6 | −2.27435 | 0.220 | 1.63351 | 23.63 |
| *7 | 51.26493 | 0.121 | | |
| *8 | −3.84835 | 0.416 | 1.54492 | 55.89 |
| *9 | −24.28973 | 0.080 | | |
| *10 | 7.72321 | 0.615 | 1.54492 | 55.89 |
| *11 | −1.02648 | 0.080 | | |
| *12 | 0.94682 | 0.351 | 1.54492 | 55.89 |
| *13 | 0.52280 | 0.527 | | |
| 14 | ∞ | 0.250 | 1.51633 | 64.14 |
| 15 | ∞ | 0.416 | | |
| 16 (image forming plane) | ∞ | | | |

*aspherical surface

TABLE 12

Example 6: Aspherical Surface Data

| Surface Number | KA | A3 | A4 | A5 | A6 |
|---|---|---|---|---|---|
| 1 | −2.0681301E−01 | 1.2238489E−02 | −2.9914007E−02 | 5.4266900E−01 | −1.0199425E+00 |
| 2 | −9.6128865E+00 | 6.3300170E−02 | 2.2999473E−01 | 1.7705378E+00 | −2.4029223E+00 |
| 4 | −4.8288637E+00 | −1.6575348E−02 | 2.8715381E−01 | −9.9202486E−01 | 2.1259734E+00 |
| 5 | −1.1087637E+01 | 8.4790249E−03 | −3.0454663E−01 | −7.8819849E−02 | 5.6846878E−01 |
| 6 | −1.4100718E+01 | −1.4321899E−02 | −8.9790566E−01 | 1.5096196E+00 | −2.9790469E+00 |
| 7 | 4.9999998E+01 | 9.1706117E−02 | −1.2824542E+00 | 2.6951911E+00 | −2.7064145E+00 |
| 8 | 3.4991812E+00 | 3.4161600E−02 | −3.9588189E−01 | −6.8834784E−01 | 5.9683830E+00 |
| 9 | −5.0000009E+01 | −3.0771303E−01 | 8.7915066E−02 | −1.4510680E+00 | 3.5695438E+00 |
| 10 | −4.2963409E+01 | −1.8915574E−01 | −1.1051689E+00 | −7.7910213E−02 | 5.6509147E−01 |
| 11 | −9.9592669E−01 | −3.0733457E−01 | 1.0658757E+00 | −1.2777595E+00 | 2.7732551E+00 |
| 12 | −6.7073619E−01 | −2.1202730E−01 | −3.3597674E−01 | −1.0016037E−01 | 5.2260376E−01 |
| 13 | −1.9903981E+00 | 1.4313275E−01 | −7.8079108E−01 | 7.5062828E−01 | −2.4072408E−01 |

| | A7 | A8 | A9 | A10 |
|---|---|---|---|---|
| 1 | 2.7579081E−01 | 1.5533398E+00 | −2.0090119E+00 | 5.7420428E−01 |
| 2 | −1.0527443E+01 | 3.7353845E+01 | −4.4224487E+01 | 1.8424894E+01 |
| 4 | −4.1838918E−01 | −5.2063938E+00 | 7.7224974E+00 | −3.5467311E+00 |
| 5 | −2.4902781E−01 | −1.2272922E+00 | 2.1201359E+00 | −1.1857967E+00 |
| 6 | 7.6542658E−01 | 9.8005017E+00 | −1.5407844E+01 | 6.6751990E+00 |
| 7 | 1.2189171E+00 | −4.5102984E−01 | 6.4472770E−01 | −4.0352380E−01 |
| 8 | −8.7533097E+00 | 2.3613819E+00 | 3.2572425E+00 | −1.7851079E+00 |
| 9 | −1.8274358E+00 | −7.7041060E−01 | −1.0717730E−01 | 5.6236861E−01 |
| 10 | −2.6733544E−02 | −3.6448885E−01 | −1.6167794E−01 | 2.1063395E−01 |
| 11 | 3.3217286E−01 | −1.8603010E−02 | −1.1350534E−01 | 3.0113158E−02 |
| 12 | −3.7782976E−01 | 1.4173604E−01 | −3.2888288E−02 | 4.0372371E−03 |
| 13 | −6.3675361E−02 | 6.6408247E−02 | −1.6239569E−02 | 1.1258179E−03 |

TABLE 13

Values Related to Conditional Formulae

| Formula No. | Expression | Example 1 | Example 2 | Example 3 | Example 4 | Example 5 | Example 6 |
|---|---|---|---|---|---|---|---|
| 1 | f · tanω/R6r | 4.680 | 4.863 | 4.196 | 4.611 | 5.236 | 5.032 |
| 2 | f/R4f | −0.369 | −0.351 | −0.482 | −0.433 | −0.610 | −0.669 |
| 3 | f/f4 | 0.202 | 0.418 | 0.440 | −0.252 | 0.408 | −0.305 |
| 4 | TTL/f | 1.443 | 1.469 | 1.366 | 1.398 | 1.485 | 1.538 |

TABLE 13-continued

Values Related to Conditional Formulae

| Formula No. | Expression | Example 1 | Example 2 | Example 3 | Example 4 | Example 5 | Example 6 |
|---|---|---|---|---|---|---|---|
| 5 | f/f12 | 1.099 | 1.018 | 1.049 | 1.046 | 1.006 | 1.014 |
| 6 | f/f5 | 1.428 | 1.476 | 1.586 | 1.883 | 1.207 | 1.511 |
| 7 | f/f2 | 1.169 | 1.097 | 1.103 | 1.130 | 1.096 | 1.183 |

What is claimed is:

1. An imaging lens consisting of six lenses in order from an object side to an image side:
  a first lens, which is of a meniscus shape having a concave surface toward the image side, having a negative refractive power;
  a second lens;
  a third lens;
  a fourth lens;
  a fifth lens having a positive refractive power; and
  a sixth lens having a negative refractive power, a concave surface toward the image side, and at least one inflection point on the surface toward the image side;
  the imaging lens satisfying the following conditional formulas:

$$1.5 < f \tan \omega / R6r < 20 \qquad (1)$$

wherein f is the focal length of the entire system, ω is the half angle of view, and R6r is the paraxial radius of curvature of the surface of the sixth lens toward the image side, and $$-0.7 < f/R4f < 0 \qquad (2)$$

wherein R4f is the paraxial radius of curvature of the surface of the fourth lens toward the object side.

2. The imaging lens as defined in claim 1 that further satisfies the following conditional formula:

$$TTL/f < 2.2 \qquad (4)$$

wherein TTL is the distance along the optical axis from the surface of the first lens toward the object side to an image formation plane in the case that the amount of back focus is an air converted length.

3. The imaging lens as defined in claim 2 that further satisfies the following conditional formula:

$$0.8 < TTL/f < 2 \qquad (4-1)$$

wherein TTL is the distance along the optical axis from the surface of the first lens toward the object side to an image formation plane in the case that the amount of back focus is an air converted length.

4. The imaging lens as defined in claim 1, wherein:
the second lens has a positive refractive power.

5. The imaging lens as defined in claim 1 that further satisfies the following conditional formula:

$$0.4 < f/f12 < 1.25 \qquad (5)$$

wherein f12 is the combined focal length of the first lens and the second lens.

6. The imaging lens as defined in claim 5 that further satisfies the following conditional formula:

$$0.7 < f/f12 < 1.2 \qquad (5-1)$$

wherein f12 is the combined focal length of the first lens and the second lens.

7. The imaging lens as defined in claim 1 that further satisfies the following conditional formula:

$$1.1 < f/f5 < 1.95 \qquad (6)$$

wherein f5 is the focal length of the fifth lens.

8. The imaging lens as defined in claim 7 that further satisfies the following conditional formula:

$$1.3 < f/f5 < 1.95 \qquad (6-1)$$

wherein f5 is the focal length of the fifth lens.

9. The imaging lens as defined in claim 1, wherein:
the third lens has a negative refractive power.

10. The imaging lens as defined in claim 1 that further satisfies the following conditional formula:

$$2 < f \tan \omega / R6r < 15 \qquad (1-1).$$

11. The imaging lens as defined in claim 10 that further satisfies the following conditional formula:

$$3 < f \tan \omega / R6r < 10 \qquad (1-2).$$

12. The imaging lens as defined in claim 1 that further satisfies the following conditional formula:

$$-0.7 < f/R4f < -0.1 \qquad (2-1)$$

wherein R4f is the paraxial radius of curvature of the fourth lens toward the object side.

13. The imaging lens as defined in claim 1, further comprising:
  an aperture stop provided between the surface of the first lens toward the object side and the surface of the second lens toward the image side.

14. The imaging lens as defined in claim 1, wherein:
the second lens is of a biconvex shape.

15. The imaging apparatus comprising the imaging lens as defined in claim 1.

16. An imaging lens consisting of six lenses in order from an object side to an image side:
  a first lens, which is of a meniscus shape having a concave surface toward the image side, having a negative refractive power;
  a second lens;
  a third lens;
  a fourth lens;
  a fifth lens having a positive refractive power; and
  a sixth lens having a negative refractive power, a concave surface toward the image side, and at least one inflection point on the surface toward the image side;
  the imaging lens satisfying the following conditional formulas:

$$1.5 < f \tan \omega / R6r < 20 \qquad (1)$$

wherein f is the focal length of the entire system, ω is the half angle of view, and R6r is the paraxial radius of curvature of the surface of the sixth lens toward the image side, and $$-0.65 < f/f4 < 0.55 \qquad (3)$$

wherein f4 is the focal length of the fourth lens.

17. The imaging lens as defined in claim 16 that further satisfies the following conditional formula:

$$-0.4 < f/f4 < 0.5 \qquad (3-1)$$

wherein f4 is the focal length of the fourth lens.

18. An imaging lens consisting of six lenses in order from an object side to an image side:
- a first lens, which is of a meniscus shape having a concave surface toward the image side, having a negative refractive power;
- a second lens;
- a third lens;
- a fourth lens;
- a fifth lens having a positive refractive power; and
- a sixth lens having a negative refractive power, a concave surface toward the image side, and at least one inflection point on the surface toward the image side;
- the imaging lens satisfying the following conditional formulas:

$$1.5 < f \cdot \tan \omega / R6r < 20 \quad (1)$$

wherein f is the focal length of the entire system, $\omega$ is the half angle of view, and R6r is the paraxial radius of curvature of the surface of the sixth lens toward the image side, and $$0.7 < f/f2 < 1.8 \quad (7)$$

wherein f2 is the focal length of the second lens.

19. The imaging lens as defined in claim 18 that further satisfies the following conditional formula:

$$0.9 < f/f2 < 1.5 \quad (7\text{-}1)$$

wherein f2 is the focal length of the second lens.

* * * * *